US007298382B1

(12) United States Patent
Tanaguchi et al.

(10) Patent No.: US 7,298,382 B1
(45) Date of Patent: Nov. 20, 2007

(54) FIGURE SELECTION METHOD, FIGURE SELECTION DEVICE, AND STORAGE MEDIUM STORING FIGURE SELECTION PROGRAM

(75) Inventors: Kazuo Tanaguchi, Kanagawa (JP); Takuya Onoue, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/461,335

(22) Filed: Dec. 15, 1999

(30) Foreign Application Priority Data

Dec. 16, 1998 (JP) ................................ 10-357646

(51) Int. Cl.
G09G 5/00 (2006.01)
(52) U.S. Cl. ...................... 345/619; 345/642; 345/650; 345/651; 345/667; 715/852; 715/862
(58) Field of Classification Search ................. 345/642, 345/650, 651, 667, 619, 862, 852, 662; 715/852, 715/862
See application file for complete search history.

(56) References Cited

FOREIGN PATENT DOCUMENTS

JP 3-131981 6/1991
JP 8-263678 10/1996

OTHER PUBLICATIONS

Aodobe Phototshop 5.0 User Guide, 1998, Adobe, p. 6, 157.*

\* cited by examiner

Primary Examiner—Kimbinh T. Nguyen
(74) Attorney, Agent, or Firm—Staas & Halsey LLP

(57) ABSTRACT

A figure selection method and device including a retrieval operation of a figure element adjacent to a designated figure element where a figure is formed by a plurality of figure elements. According to an aspect of the present invention, the retrieval operation is configured to retrieve a figure element neighboring the designated figure element such that the designation is automatically accomplished without individually designating each of the figure elements neighboring the designated figure element. The retrieval operation is further configured to perform a retrieval process a predetermined number of times such that figure elements adjacent to or in the neighborhood of figure elements are automatically designated the predetermined number of times. Further, the figure selection method of the present invention includes displaying the figure element retrieved by the retrieval operation according to a style different from that of other figure elements, and allows the automatically-designated figure elements to be distinguished from other figure elements.

Further, a computer-readable storage medium of the present invention stores a figure selection program to retrieve a figure element adjacent to the designated figure element in a storage medium storing a figure selection program for selecting a figure formed by a plurality of figure elements. Accordingly, designation is automatically accomplished without the need to individually designate figure elements adjacent to the designated figure element.

17 Claims, 52 Drawing Sheets

FIGURE ELEMENTS ARE CONNECTED AT THE ENDS IN THE CASE WHERE INTERSECTION IS AT THE ENDS OF THE RESPECTIVE ELEMENTS, UNDER THE END-CONNECTED STATE AS SHOWN IN FIG. 8

  FIGURE ELEMENTS WITH AN INTERSECTION
(a)  (b)
FIG. 8

FIGURE ELEMENTS WITH TWO INTERSECTIONS (a) ——— ———   FIGURE ELEMENTS WHICH ARE ON THE SAME STRAIGHT LINE (CURVED LINE) AND DO NOT CROSS
(b) ———·———

| FIGURE ELEMENTS THAT INTERSECT WHEN EXTENDED

FIG. 10

(a)   (b)   ◯ : SIZE OF A PREDETERMINED ERROR, FOR EXAMPLE, ABOUT $10^{-3}$

| NUMBER OF REGISTERED ELEMENTS = N | |
|---|---|
| 1 | FIGURE ELEMENT ID |
| 2 | FIGURE ELEMENT ID |
| 3 | FIGURE ELEMENT ID |
| ⋮ | ⋮ |
| N | FIGURE ELEMENT ID |

TABLE 1

FIG. 12

TABLE 2

| FIGURE ELEMENT ID |
|---|
| REFERENCE POINT COORDINATE VALUE |

TABLE 3

F I G. 1 4

| DIRECTION (POSITIVE/NEGATIVE) |
|---|

TABLE 4

F I G. 1 5

TABLE 5

TABLE 6

A: END-CONNECTED STATE
B: CROSSED STATE
C: ROOT STATE

Dist: DISTANCE BETWEEN REFERENCE POINT AND BRANCH POINT (INTERSECTION): DIRECTION FROM REFERENCE POINT TO START SIDE IS NEGATIVE DIRECTION AND DIRECTION FROM REFERENCE POINT TO END SIDE IS POSITIVE DIRECTION

| GENERATION | |
|---|---|
| NUMBER OF BRANCHES = N | |
| 1 | BRANCH ID |
| 2 | BRANCH ID |
| 3 | BRANCH ID |
| ⋮ | ⋮ |
| N | BRANCH ID |

TABLE 7

FIG. 22

TABLE 8

| HEAD END-CONNECTED FIGURE ELEMENT ID | |
|---|---|
| NUMBER OF END-CONNECTED BRANCHES = N | |
| 1 | BRANCH ID |
| 2 | BRANCH ID |
| 3 | BRANCH ID |
| ⋮ | ⋮ |
| N | BRANCH ID |

TABLE 9

FIG. 25

TABLE 10

TABLE 11

TABLE 12

TABLE 13

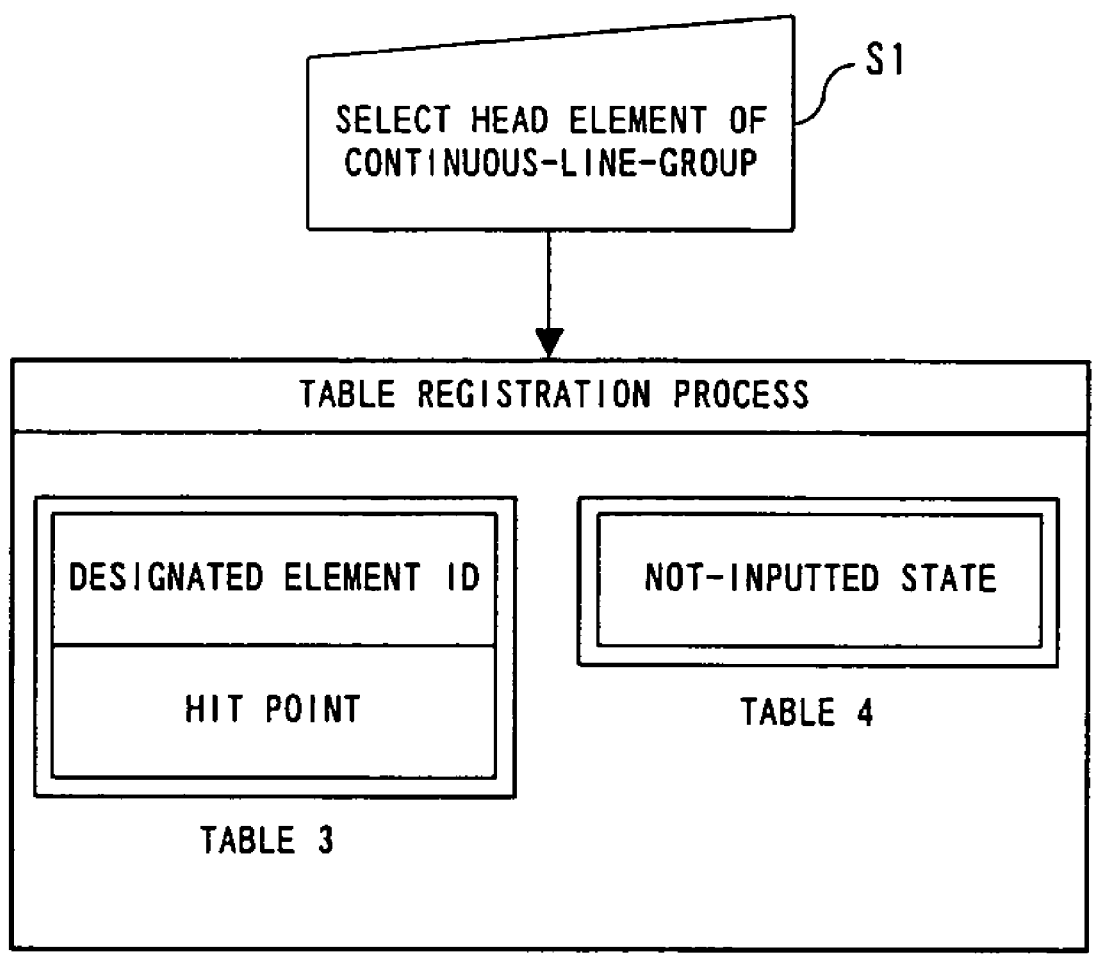
F I G. 3 2

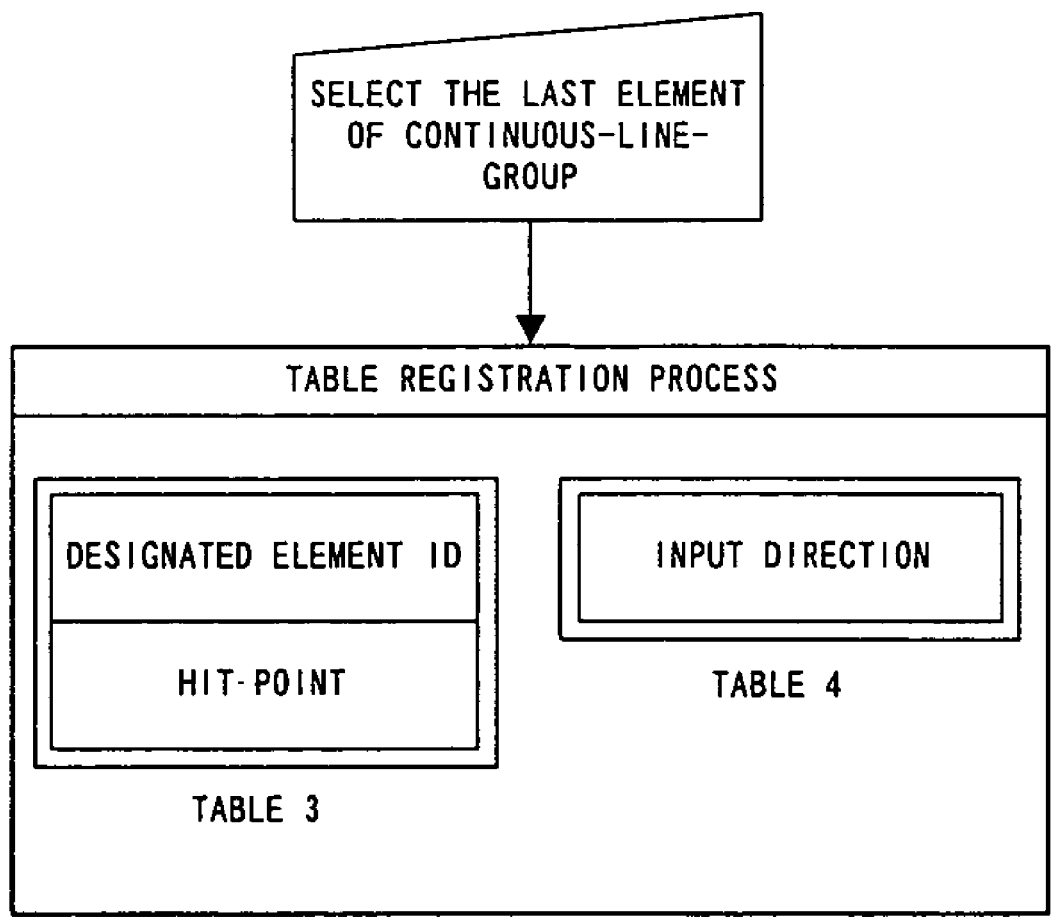
F I G. 4 0

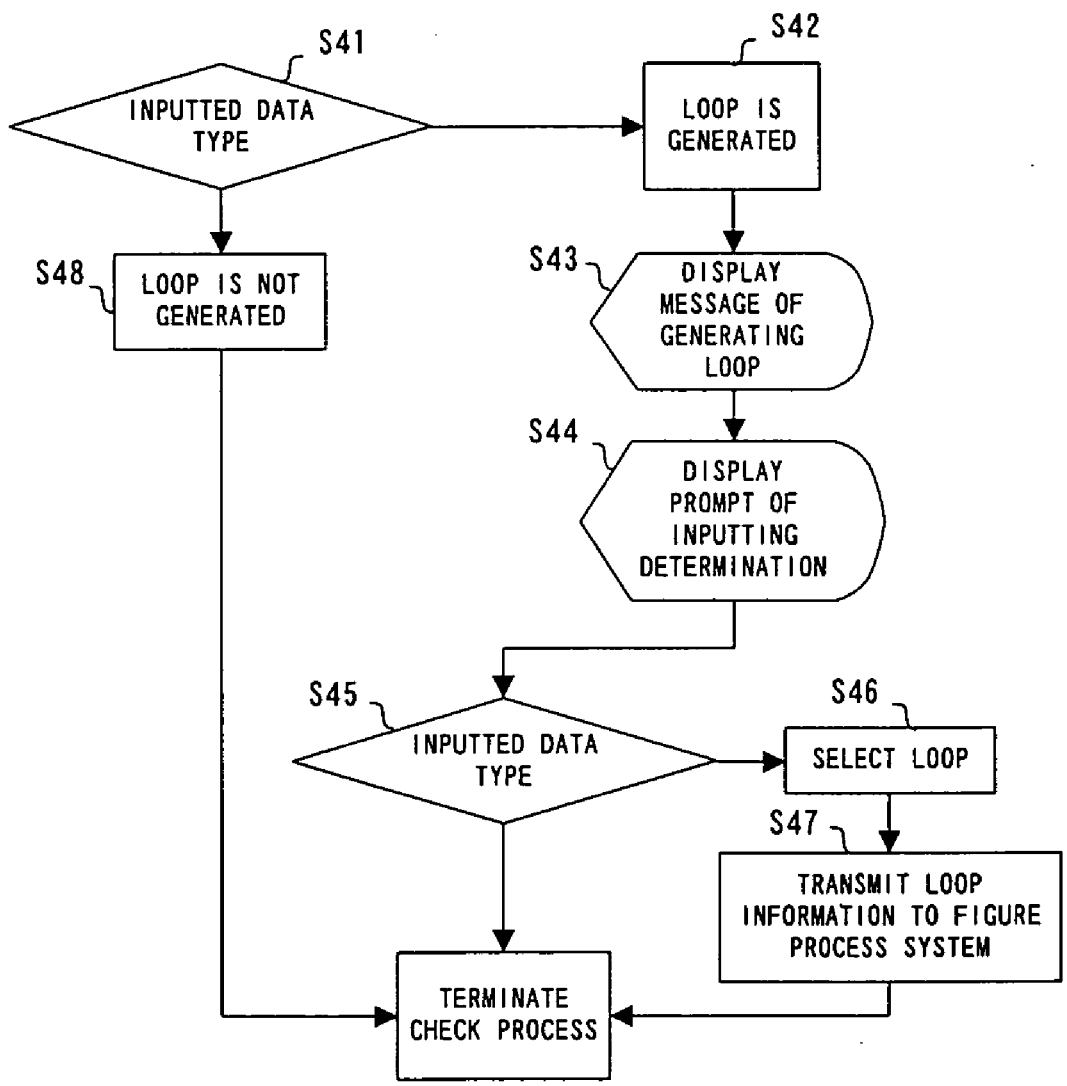
F I G. 4 3

ND STORAGE
FIGURE SELECTION METHOD, FIGURE SELECTION DEVICE, AND STORAGE MEDIUM STORING FIGURE SELECTION PROGRAM

BACKGROUND OF THE INVENTION

1. Field of the Invention

The present invention relates to a figure selection method, a figure selection device, and a storage medium storing a figure selection program when an arbitrary figure is selected for editing to make correction, transfer, copy, cancellation, grouping, conversion into 2D(two dimension)/3D(three dimension), and so on, in a CAD system or the like.

2. Description of the Related Art

A selection operation of a figure to be edited is frequently repeated for editing to make correction, transfer, copy, cancellation, grouping, conversion into 2D(two dimension)/3D(three dimension) and and so on, in a CAD system or the like.

A figure is generally represented by a point, a line, a plane, a solid, or a collection thereof or a part thereof (edge or the like). A figure element is a basic unit to form a figure, and it is broadly represented by a point, a line, a plane, a solid, or a collection thereof or a part thereof (edge or the like). Narrowly speaking, however, a figure element is represented by a line, but in the present specification, it is represented by linear data including a straight line, a curved line, a circle, an arc, a spline curved line and the like.

FIG. 1 is a diagram explaining a pick-method of the first prior art.

In FIG. 1, in order to select a figure 5100 formed by figure elements 5101, 5102, 5103, 5104, 5105, 5106, 5107 and 5108 using a pick-method, an arrow-shaped pointer 5110 is displayed on a display using an input unit such as a mouse or the like, and the mouse is clicked placing a head of the pointer 5110 on at least six figure elements 5101, 5102, 5103, 5104, 5106, and 5108, thereby selecting the desired figure 5100.

FIG. 2 is a diagram explaining a chain retrieval method of the second prior art. In FIG. 2, in order to select a figure 5200 formed by figure elements 5201 to 5104 using a chain retrieval method, an arrow-shaped pointer 5210 is displayed on a display using an input unit such as a mouse or the like similarly to the pick-method, and the mouse is clicked placing a head of the pointer 5210 on the figure element 5201 which is one of the figure elements forming the figure 5200 to be selected. Thus, the system automatically selects figure elements 5202, 5203, and 5204 which uniformally follow the figure element 5201, thereby selecting the desired figure 5200.

FIG. 3 is a diagram explaining a maximum/minimum closed-loop retrieval method of the third prior art.

In FIG. 3, an arrow-shaped pointer 5320 is displayed on a display using an input unit such as a mouse or the like, and the mouse is clicked placing a head of the pointer 5320 on a figure element 5301 which is one of the figure elements. Thus, in the maximum closed-loop retrieval method, the system retrieves a maximum closed-loop figure 5330 formed by figure elements 5301, 5302, 5303, 5304, 5305, 5306, 5307 and 5308. In the minimum closed-loop retrieval method, the system retrieves a minimum closed-loop figure 5340 formed by figure elements 5301, 5308, 5309, and 5310. Thus, desired figures 5330 and 5340 are selected.

As the forth prior art, there is a combination method of combining more than two methods of the above-mentioned pick-method, chain retrieval method, and maximum/minimum closed-loop retrieval method. When a desired figure is selected by the combination method, a desired figure is selected while selecting the respective methods depending on each mode in such a way that the pick-method is used in a pick-mode, the chain retrieval method is used in a chain retrieval mode, the maximum closed-loop retrieval method is used in a maximum closed-loop retrieval mode, and the minimum closed-loop retrieval method is used in a minimum closed-loop retrieval mode.

In the figure selection method described in each prior art, however, there have been the following problems.

In the case of the pick-method of the first prior art, operations should be performed many times for the selection of a desired figure. The mouse should be clicked on a figure element at least six times in order to select, for example, the figure 5100 shown in FIG. 1.

In the case of the chain retrieval method of the second prior art, the mouse is clicked on a figure element only one time, but only the figure formed by a group of figure elements following the mouse-clicked figure element can be selected. Therefore, the shape of a figure which can be selected is restricted. For example, the figure 5200 shown in FIG. 2 can be selected by clicking the figure element 5201 one time using a mouse. This is because the figure elements 5202, 5203 and 5204 are sequentially and uniformally determined following the figure element 5201. That is, only a figure in which another figure element is not connected with the connection part of two figure elements can be selected.

In the case of the maximum/minimum closed-loop retrieval method of the third prior art, a figure element is clicked only one time using a mouse similarly to the chain retrieval method. Further, a figure in which another figure element is connected with the connection part of two figure elements can be selected. The thus-selected figure is an outermost closed-loop figure, or an innermost closed-loop figure which contains a mouse-clicked figure element.

In the case of the combination method of the forth prior art, a figure can be selected making use of each advantage of the above-mentioned conventional figure selection methods described in the first to third prior arts. However, an additional operation such as the switching of each mode is required.

When the chain retrieval method or the maximum/minimum closed-loop retrieval method is used, figure elements to be connected cannot be retrieved by these methods in the following cases:

(1) Two figure elements to be connected are not connected in the case where errors are generated while a figure is being prepared or in the case where existing data stored in an old CAD system which uses precision data with single precision are transferred to a new CAD system which uses precision data with double precision; and (2) A cause-and-effect relationship exists between two figure elements even if they are not really connected as in the case where the figure elements are omitted or the figure elements are hidden lines.

SUMMARY OF THE INVENTION

The present invention has been developed to solve the above-mentioned problems, and aims at realizing a figure selection method, a figure selection device, and a storage medium storing a figure selection program, for selecting a desired figure with a minimum number of operations.

In a first aspect of the present invention, a figure selection method is a method for selecting a figure formed by a plurality of a figure element, and the method is arranged to include a retrieval process of figure elements adjacent to the designated figure element.

In a second aspect of the present invention, a figure selection device is a device selecting a figure formed by a plurality of figure elements, and the device is arranged to include a figure element designation unit designating a figure element and a figure element retrieval unit retrieving a figure element adjacent to the designated figure element.

In a third aspect of the present invention, a computer-readable medium storing a figure selection program is a storage medium storing a figure selection program selecting a figure formed by a plurality of figure elements, and the medium is configured to retrieve a figure element adjacent to the designated figure element.

The present invention retrieves a figure element in the neighborhood of the designated figure element.

Further, the present invention retrieves a figure element adjacent to the retrieved figure element.

Still further, the present invention is arranged to retrieve a figure element a predetermined number of times.

Yet further, the present invention displays the retrieved figure element in a style different from that of the other not-retrieved figure elements.

BRIEF DESCRIPTION OF THE DRAWINGS

FIG. 8 shows two examples of a crossed-element state which represents one of the relationships between figure elements;

FIG. 10 shows two examples of a connection candidate after-corrected state which represents one of the relationships between figure elements;

FIG. 12 is a table 1 showing data arrangement;
FIG. 14 is a table 3 showing data arrangement;
FIG. 15 is a table 4 showing data arrangement.

FIG. 22 is a table 7 showing data arrangement;
FIG. 25 is a table 9 showing data arrangement.

FIG. 32 is a diagram showing a table registration process when a first figure element is selected;

FIG. 40 is a diagram explaining the table registration process when a branch is designated (selected);
FIG. 43 is a flowchart of a closed-loop check process.

DESCRIPTION OF THE PREFERRED EMBODIMENT

Figure 1:
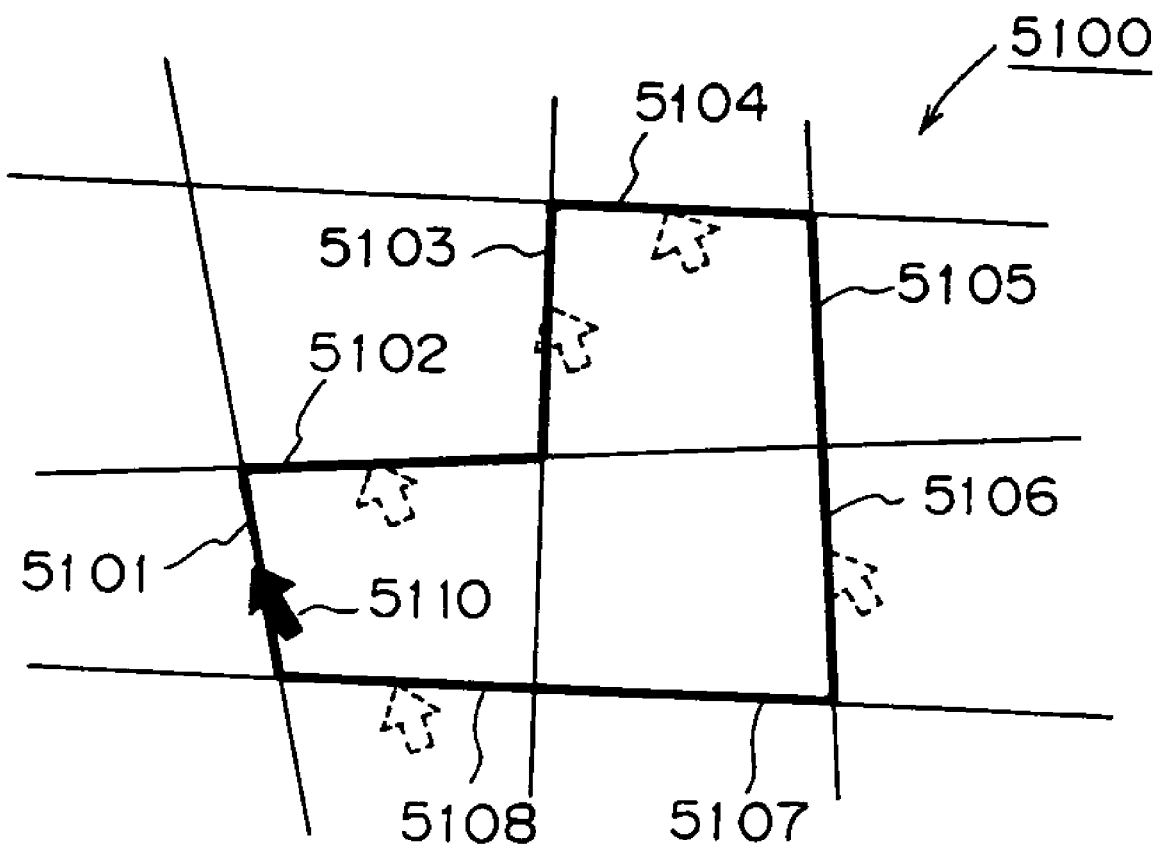
FIG. 1 is a drawing explaining a pick-method of the first prior art.
Figure 2:
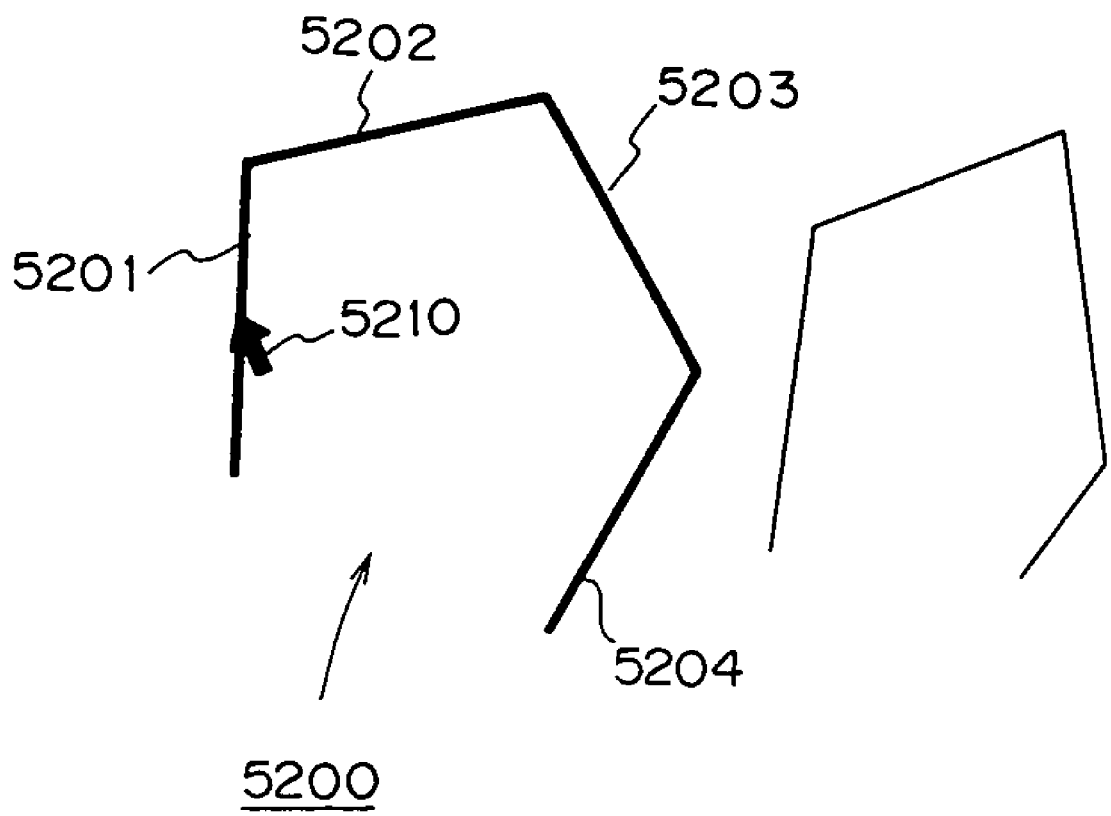
FIG. 2 is a diagram explaining a chain retrieval method of the second prior art.
Figure 3:
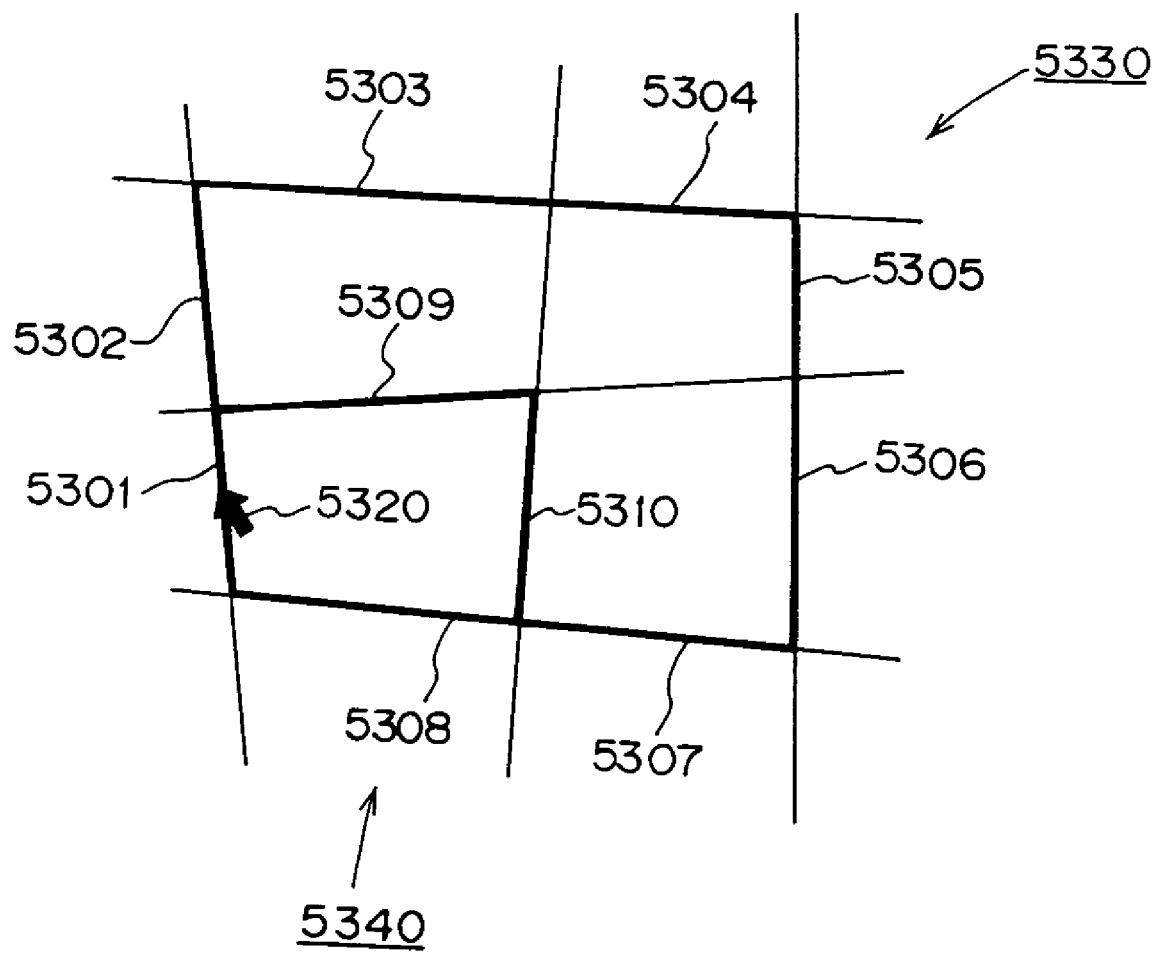
FIG. 3 is a diagram explaining a maximum/minimum closed-loop retrieval method of the third prior art.

The embodiments of the present invention will be explained in detail with reference to the drawings.

The present invention uses the following means to solve the above-mentioned problems.

The figure selection method described in claim 1 of the present invention includes a retrieval process of a figure element adjacent to the designated figure element, in a figure selection method of selecting a figure formed by a plurality of figure elements. Thus, designation can be automatically accomplished without designating figure elements which are adjacent to the designated figure element.

A figure selection method described in claim 2 of the present invention is the figure selection method described in claim 1. The retrieval process is arranged to retrieve a figure element in the neighborhood of the designated figure element. Thus, designation can be automatically accomplished without designating figure elements which are in the neighborhood of the designated figure element.

A figure selection method described in claim 3 of the present invention is the figure selection method described in claim 1. The retrieval process is arranged to further retrieve a figure element adjacent to the retrieved figure element. Thus, designation can be automatically accomplished without designating figure element adjacent to or in the neighborhood of the figure elements which are adjacent to or in the neighborhood of the designated figure element.

A figure selection method described in claim 4 of the present invention is the figure selection method described in claim 3. The retrieval process is arranged to retrieve a figure element the predetermined number of times. Accordingly, figure elements adjacent to or in the neighborhood of the figure elements which are adjacent to or in the neighborhood of the designated figure element are automatically designated the predetermined number of times.

A figure selection method described in claim 5 of the present invention is the figure selection method described in claim 1, and is arranged to include a process of displaying a figure element which has been retrieved by the retrieval process, in a style different from that of other figure elements. Therefore, the automatically-designated figure elements can be distinguished from other not-designated figure elements.

A figure selection device described in claim 6 of the present invention is arranged to include a figure element designation unit designating a figure element, and a figure element retrieval unit retrieving a figure element adjacent to the designated figure element, in a figure selection device selecting a figure formed by a plurality of figure elements. Thus, designation can be automatically accomplished without designating figure elements adjacent to the designated figure element.

A figure selection device described in claim 7 of the present invention is the figure selection device described in claim 6. The figure element retrieval unit is arranged to further retrieve a figure element in the neighborhood of the designated figure element. Thus, designation can be automatically accomplished without designating figure elements in the neighborhood of the designated figure element.

A figure selection device described in claim 8 of the present invention is the figure selection device described in claim 6. The figure element retrieval unit is arranged to further retrieve a figure element adjacent to the retrieved figure element. Thus, designation can be automatically accomplished without designating figure elements adjacent to or in the neighborhood of the figure elements which are adjacent to or in the neighborhood of the designated figure element.

A figure selection device described in claim 9 of the present invention is the figure selection device described in claim 8. The figure element retrieval unit is arranged to further retrieve a figure element the predetermined number of times. Thus, a figure element adjacent to or in the neighborhood of the figure element which is adjacent to or in the neighborhood of the designated figure element, is automatically designated the predetermined number of times.

A figure selection device described in claim 10 of the present invention is the figure selection device described in claim 6. Further, the device is arranged to have a display unit displaying the figure element retrieved by the figure element retrieval unit in a style different from that of the other figure elements. Thus, the automatically designated figure element can be distinguished from other not-designated figure elements.

A computer-readable storage medium described in claim 11 of the present invention, which stores a figure selection program, is configured to retrieve a figure element adjacent to the designated figure element in a storage medium storing a figure selection program for selecting a figure performed by a plurality of figure elements. Thus, designation can be automatically accomplished without designating figure elements adjacent to the designated figure element.

A computer-readable storage medium described in claim 12 of the present invention, which stores a figure selection program, is the storage medium storing a figure selection program described in claim 11, and the retrieval process is arranged to retrieve the figure element in the neighborhood of the designated figure element. Thus, designation can be automatically accomplished without designating figure elements in the neighborhood of the designated figure element.

A computer-readable storage medium described in claim 13 of the present invention, which stores a figure selection program, is the storage medium storing a figure selection program described in claim 11, and the retrieval process is arranged to further retrieve the figure element adjacent to the retrieved figure element. Thus, designation can be automatically accomplished without designating figure elements adjacent to or in the neighborhood of the figure element which is adjacent to or in the neighborhood of the designated figure element.

A computer-readable storage medium described in claim 14 of the present invention, which stores a figure selection program, is a storage medium storing the figure selection program described in claim 13, and the retrieval process retrieves a figure element the predetermined number of times. Thus, the figure elements adjacent to or in the neighborhood of the figure element which is adjacent to or in the neighborhood of the designated figure element, is automatically designated the predetermined number of times.

A storage medium storing the figure selection program described in claim 15 of the present invention is a storage medium storing the figure selection program described in claim 11. Further, the medium is configured to display the figure element retrieved by the retrieval process, in a style different from that of other figure elements. Thus, the automatically designated figure element can be distinguished from other not-designated figure elements.

Figure 4:
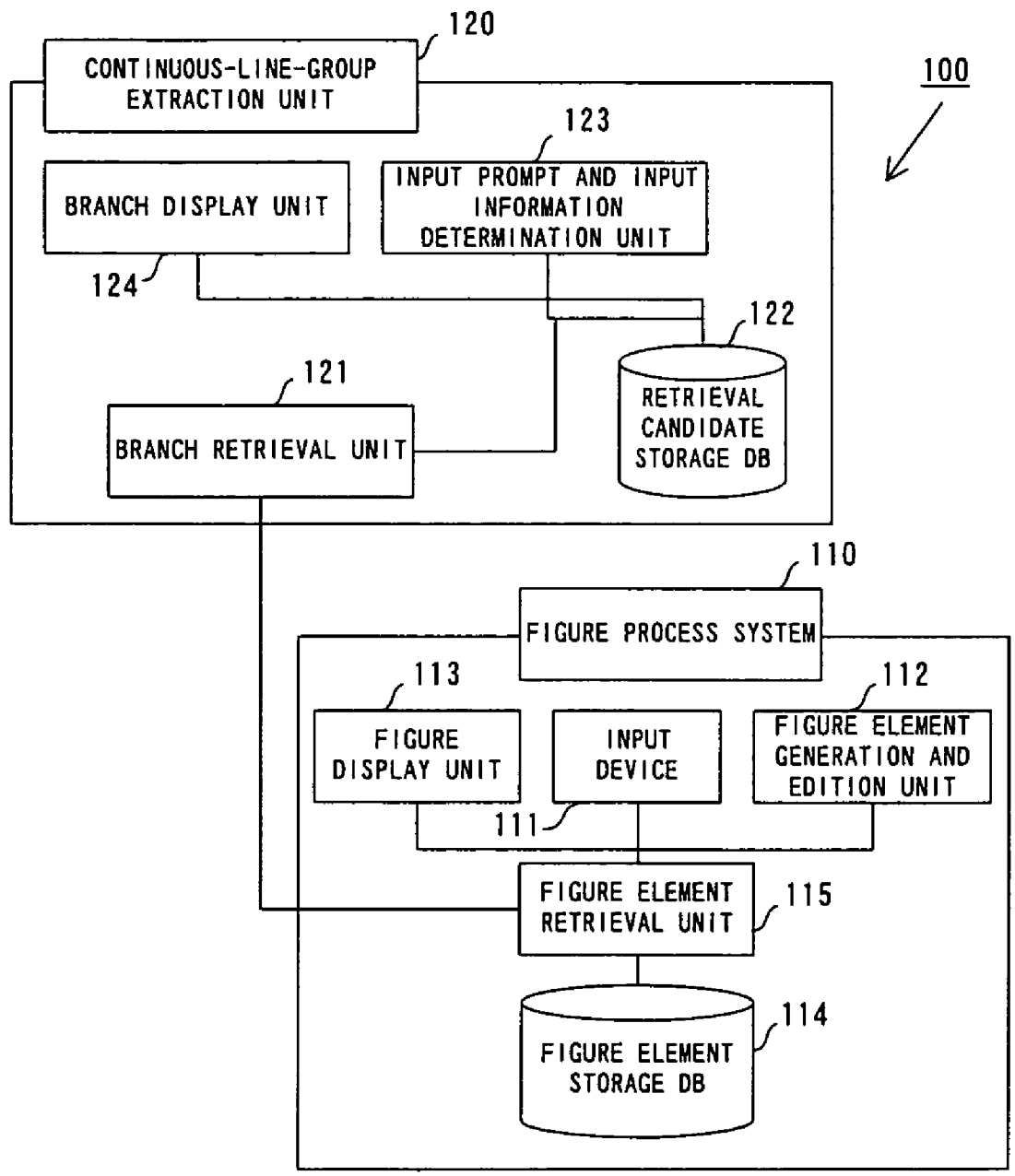
FIG. 4 is a diagram showing the whole arrangement of a figure selection system 100 applied by the present invention.

FIG. 4 is a diagram showing the whole arrangement of a figure selection system 100 applied by the present invention.

In FIG. 4, the figure selection system 100 is provided with a figure process system 110 and a continuous-line-group extraction unit 120.

The figure process system 110 is a drawing software system or the like for drawing a construction design plan, an electric circuit design plan, a machine construction design plan, or the like. The system 110 has an input device 111, a figure element generation and edition unit 112, a figure display unit 113, a figure element storage DB 114, and a figure element retrieval unit 115.

The input device 111 is a keyboard, a pointing device, or the like such as a mouse, a joy stick, a track ball, a track pad or the like. The device inputs the coordinate data for generating a figure, inputs instructions for the edition of a figure, or the like. The figure element generation and edition unit 112 generates or edits figure elements based on the data or the instructions inputted by the input device 111. The figure display unit 113 is a display device such as a CRT display, an LCD, and so on. The unit displays data inputted by the input device 111, figure elements edited by the figure element generation and edition unit 112, and so on. The figure element storage DB 114 is a database for storing figure elements generated and edited by the figure element generation and edition unit 112. Based on the instructions inputted by the input device 111, the figure element retrieval unit 115 retrieves figure elements which are stored in the figure element storage DB 114 and which are required by the edition process of the figure element generation and edition unit 112.

The continuous-line-group extraction unit 120 handles as linear data the figure elements generated, edited, retrieved, and displayed by the figure process system 110. The unit functions as an information process device for extracting other figure elements which are connected with one figure element or are regarded to be connected with one figure element, as a continuous-element group. The unit is provided with the branch retrieval unit 121, a retrieval candidate storage DB 122, an input prompt and input information determination unit 123, and the branch display unit 124.

The branch retrieval unit 121 retrieves other figure elements (branches observed from one figure element) which are connected with one figure element or are regarded to be connected with one figure element, the detailed explanation of which will be described later. The retrieval candidate storage DB 122 stores various kinds of data regarding figure elements retrieved by the branch retrieval unit 121, the detailed explanation of which will be described later. The input prompt and input information determination unit 123 prompts an operator to input data or instructions, and determines the data or the instructions inputted by the operator. The branch display unit 124 performs a process for displaying figure elements or the like retrieved by the branch retrieval unit 121 on a display which is common to the figure display unit 113, the detailed explanation of which will be described later.

Figure 5:
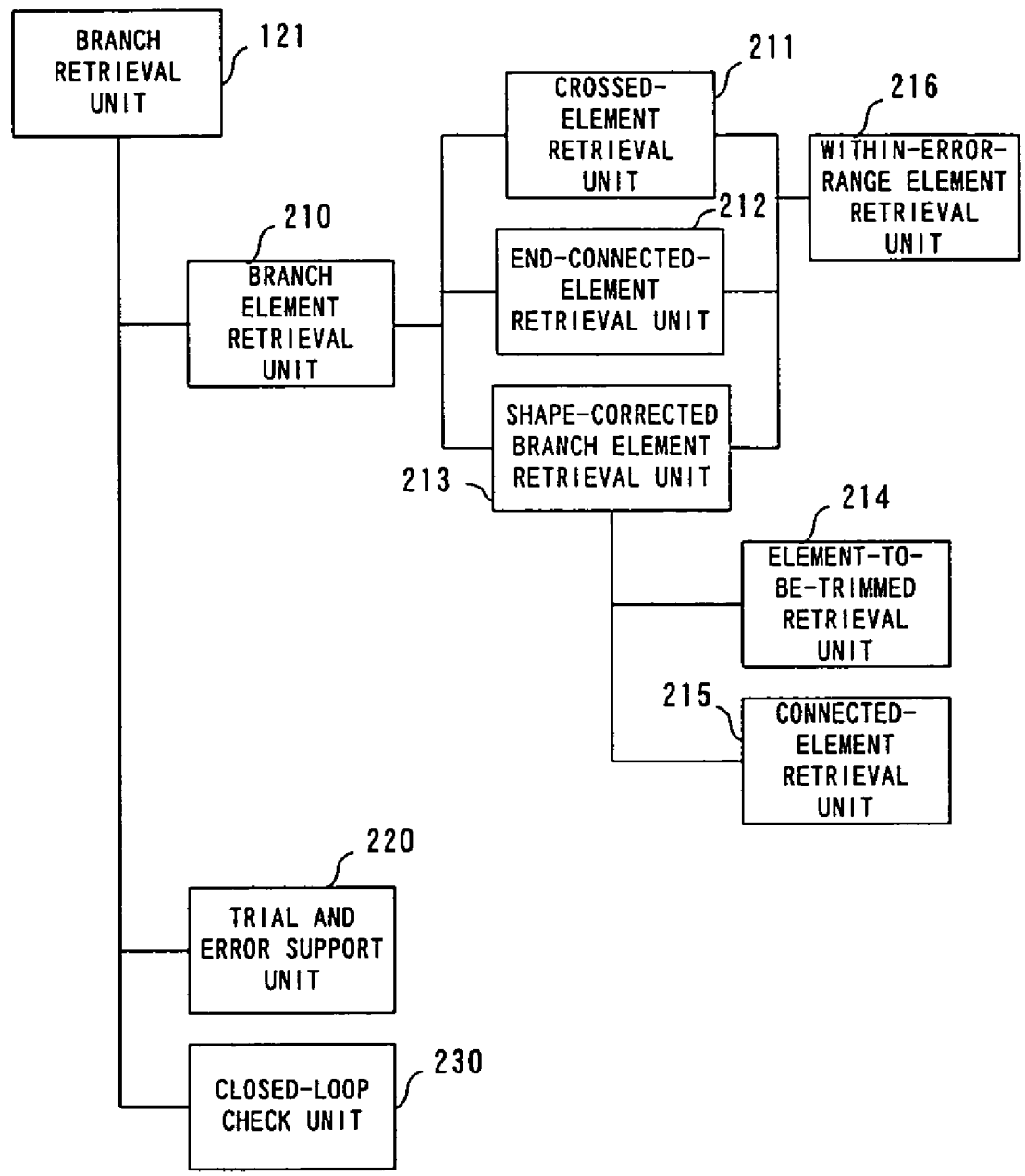
FIG. 5 is a diagram showing the function arrangement of a branch retrieval unit 121.

FIG. 5 is a diagram showing the function arrangement of a branch retrieval unit 121.

In FIG. 5, the branch retrieval unit 121 is provided with a branch element retrieval unit 210, a trial and error support unit 220, and a closed-loop check unit 230.

The branch element retrieval unit 210 is provided with a crossed-element retrieval unit 211, an end-connected-element retrieval unit 212, a shape-corrected branch element retrieval unit 213 having an element-to-be-trimmed retrieval unit 214 and a connected-element retrieval unit 215, and a within-error-range element retrieval unit 216. The unit retrieves other figure elements which are connected with one figure element or are regarded to be connected with one figure element. In this case, one figure element is made to be a reference element.

Hereinafter, a figure element and the relationship between two figure elements will be explained in reference to FIGS. 6 to 11.

Figure 6:
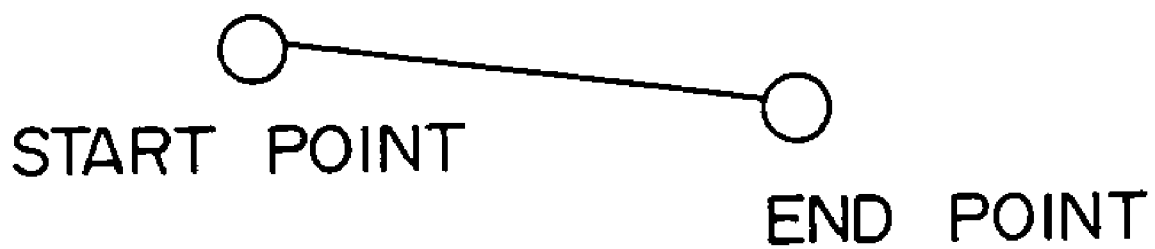
FIG. 6 is a diagram showing a straight line which is the most fundamental figure element.

FIG. 6 is a diagram showing a straight line which is the most fundamental figure element.

In FIG. 6, both ends of a figure element are a start point and an end point.

Figure 7:
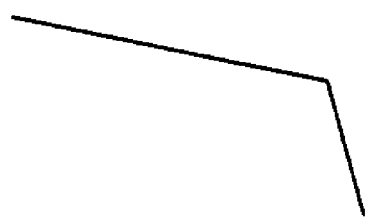
FIG. 7 is a diagram showing the example of an end-connected state, which represents one of the relationships between figure elements.

FIG. 7 is a diagram showing an example of the end-connected state, which represents one of the relationships between figure elements.

In FIG. 7, with respect to two figure elements, one end of one figure element is connected with one end of the other figure element. The connected ends correspond to a case where the intersection has a crossed state, which will be described later, and are at the ends of the two figure elements. Therefore, the connected point is a named intersection.

FIG. 8 shows two examples of a crossed state which represents one of the relationships between the two figure elements.

In (a), a part except for ends of one figure element is connected with one end of the other figure element. In (b), the two figure elements are crossed at one part except for the ends of the respective figure elements. The connected or crossed point is a named intersection.

Figure 9:
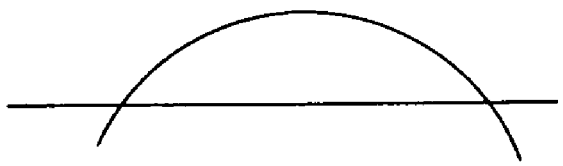
FIG. 9 is a diagram showing a root state which is one of the relationships between figure elements.

FIG. 9 is a diagram showing a root state which is one of the relationships between figure elements.

In FIG. 9, two figure elements are crossed at two points except for the respective ends, and the respective crossed points are intersections. The two points are regarded to have the end-connected state or the crossed state.

FIG. 10 shows two examples of the connection candidate after a corrected state which represents one of the relationships between the two figure elements.

In FIG. 10, two figure elements are neither connected nor crossed, and they are connected or crossed with each other by a shape correction process. In (a), two figure elements are on the same straight line. Therefore, they will be in the end-connected state by performing a connection correction process of extending both or one of the figure elements. In (b), the two figure elements are not on the same straight line, but they will be in the end-connected state or the crossed state by performing a connection correction process of extending the respective figure elements.

Figure 11:
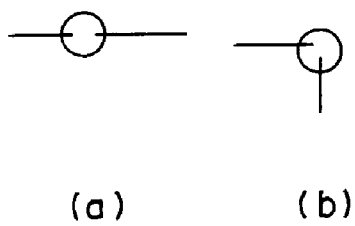
FIG. 11 shows two examples where figure elements are crossed or connected within an error range, which represents one of the relationships between figure elements.

FIG. 11 shows two examples where figure elements are crossed or connected with each other within an error range, which represents one of the relationships between figure elements.

In these figures, two figure elements are neither connected nor crossed with each other similarly to the above-mentioned examples of the connection candidate after a corrected state, but they will be connected or crossed by performing a general error correction process. In (a), two figure elements are approximately on the same straight line, but they will be in the end-connected state by performing an error correction process to both or one of the figure elements.

In (b), two figure elements are not on the same straight line, but they will be in the end-connected state or the crossed state by performing an error correction process to both figure elements.

The figure elements shown in FIG. 10 and FIG. 11 are straight lines, but they can be either straight lines or curved lines if they are connected or crossed with each other by performing an extension process or an error correction process.

Explanation returns to FIG. 5.

The crossed-element retrieval unit 211 retrieves figure elements which cross a reference element.

The end-connected-element retrieval unit 212 retrieves figure elements whose ends are connected with the end of a reference element.

The shape-corrected branch element retrieval unit 213 retrieves a figure element whose end is connected or crossed with the end of a reference element after performing a shape correction process.

The element-to-be-trimmed retrieval unit 214 retrieves a figure element which crosses a reference element and is to be trimmed at a part between the intersection and one end thereof.

The connected-element retrieval unit 215 retrieves a figure element which can cross a reference element after it is corrected.

The within-error-range element retrieval unit 216 retrieves a figure element which is crossed or connected with a reference element within an error range.

The trial and error support unit 220 registers a designated figure element as a reference element in the retrieval candidate storage DB 122 when the branch element retrieval unit 210 performs a retrieval process or the like. When the closed-loop check unit 230 repeats a continuous-line-group extraction process based on the designated figure element, it checks whether or not the extracted continuous-line-group is in the shape of a loop.

Next, the data arrangement of each table provided in the retrieval candidate storage DB 122 shown in FIG. 4 will be explained in reference to FIGS. 12 to 29.

FIG. 12 is a table 1 showing data arrangement.

In the order of determination (connection order as a continuous-line group), Table 1 registers the number of figure elements (the number of registered elements) which are retrieved by the branch retrieval unit 121 to be determined as a continuous-line-group, and IDs (figure element IDs) of the figure elements stored in the figure element storage DB 114.

Figure 13:
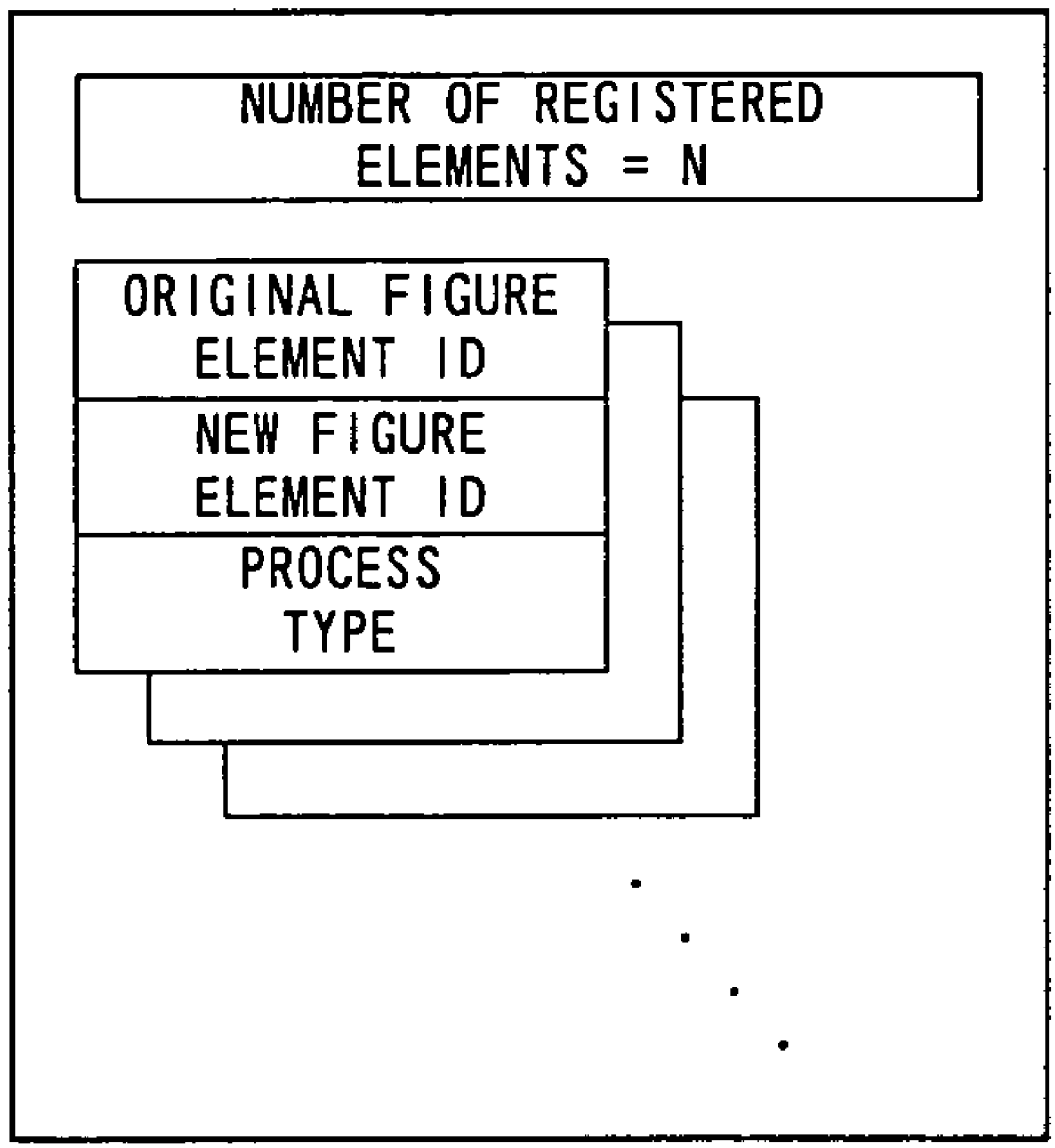
FIG. 13 is a table 2 showing data arrangement.

FIG. 13 is a Table 2 showing data arrangement.

Table 2 registers the following:

(1) the number of figure elements (the number of registered elements) which are determined as part of the continuous-line-group after they are retrieved by the shape-corrected branch element retrieval unit 213 having the element-to-be-trimmed retrieval unit 214 or the connected-element retrieval unit 215;

(2) a pointer (original figure element ID) to the ID of the determined figure element stored in the figure element storage DB 114 or the figure element ID stored in Table 1;

(3) ID of a corrected figure element (new figure element ID); and (4) a correction process type either of a trimming correction process and a connection correction process.

FIG. 14 is a Table 3 showing data arrangement.

Table 3 registers the ID (figure element ID) of the reference element stored in the figure element storage DB 114 when a retrieval process starts, and a coordinate value (reference point coordinate value) when the reference element is designated.

FIG. 15 is a Table 4 showing data arrangement.

Table 4 registers a direction from the reference point when a retrieval process is performed. An end side observed from the reference point is a positive direction, and a start point side observed from the reference point is a negative direction.

Figure 16:
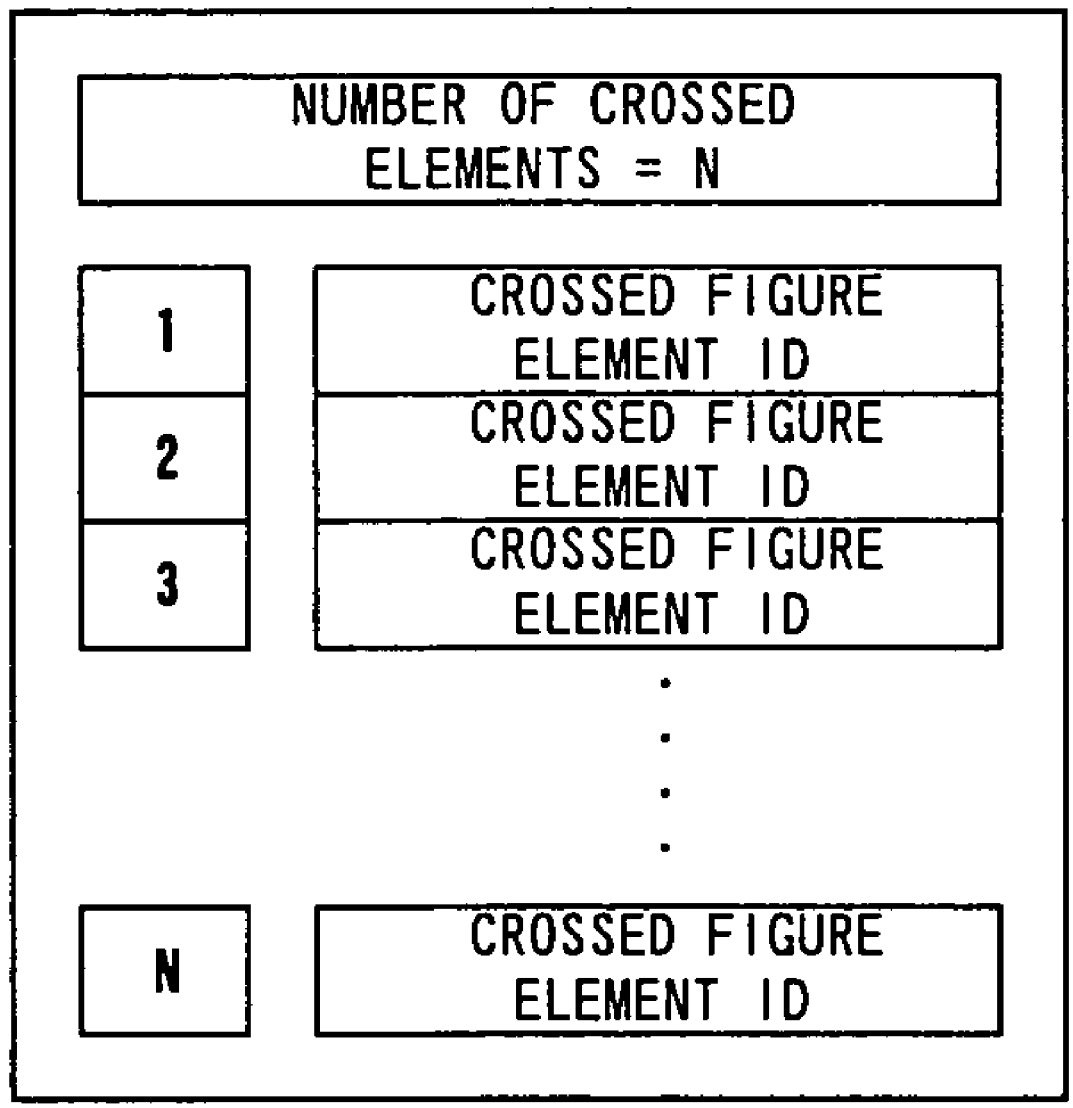
FIG. 16 is a table 5 showing data arrangement.

FIG. 16 is a Table 5 showing data arrangement.

Table 5 registers (1) the number of figure elements (number of crossed elements) which cross an objected figure element (object element) under the crossed state; the end-connected state, the loop-shaped state or the like, and (2) IDs (crossed figure element IDs) assigned to the figure elements which cross the object element.

Figure 17:
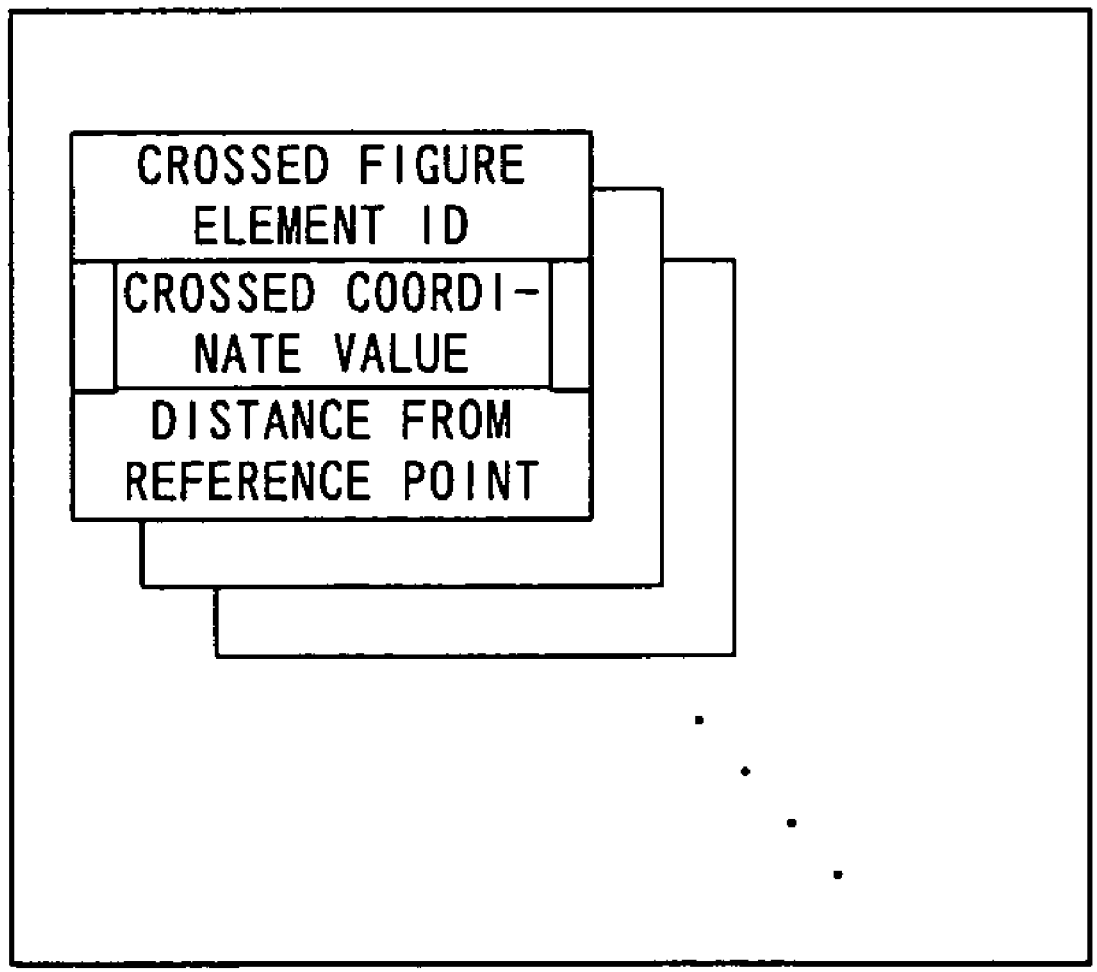
FIG. 17 is a table 6 showing data arrangement.

FIG. 17 is a Table 6 showing data arrangement.

Table 6 registers data of figure elements which cross the objected figure element (object element) under the crossed state, the end-connected state, the loop-shaped state or the like, and more specifically registers the following:

(1) the ID (crossed figure element ID) assigned to each of crossed figure elements which are registered in Table 5;

(2) a coordinate value (cross coordinate value) of the crossed point; and (3) a distance (distance from the reference point) between the reference point to the crossed point.

Figure 18:
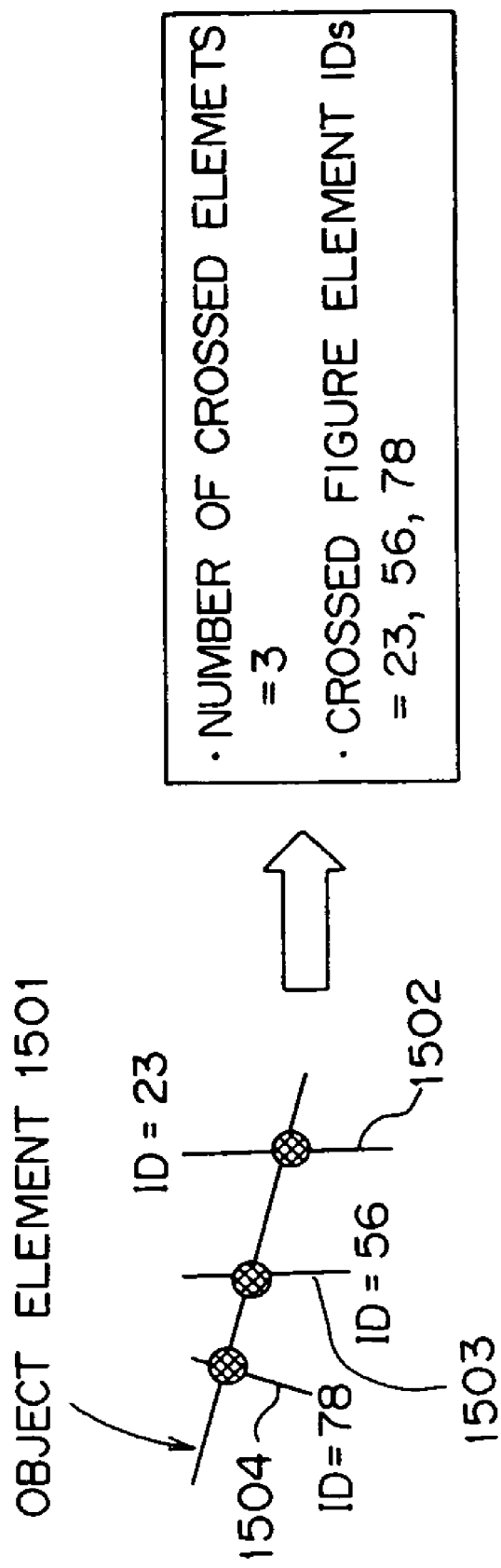
FIG. 18 is a diagram showing a case where three figure elements cross an object figure element.

FIG. 18 is a diagram showing a case where three figure elements cross an object element.

In FIG. 18, three figure elements 1502, 1503 and 1504 cross an object element 1501, and IDs 23, 56, and 78 are assigned to the figure elements, respectively. Therefore, 3 is registered in item "the number of crossed elements" shown in Table 5, and each of 23, 56, and 78 is registered in item "crossed branch ID" shown in Table 6.

Figure 19:
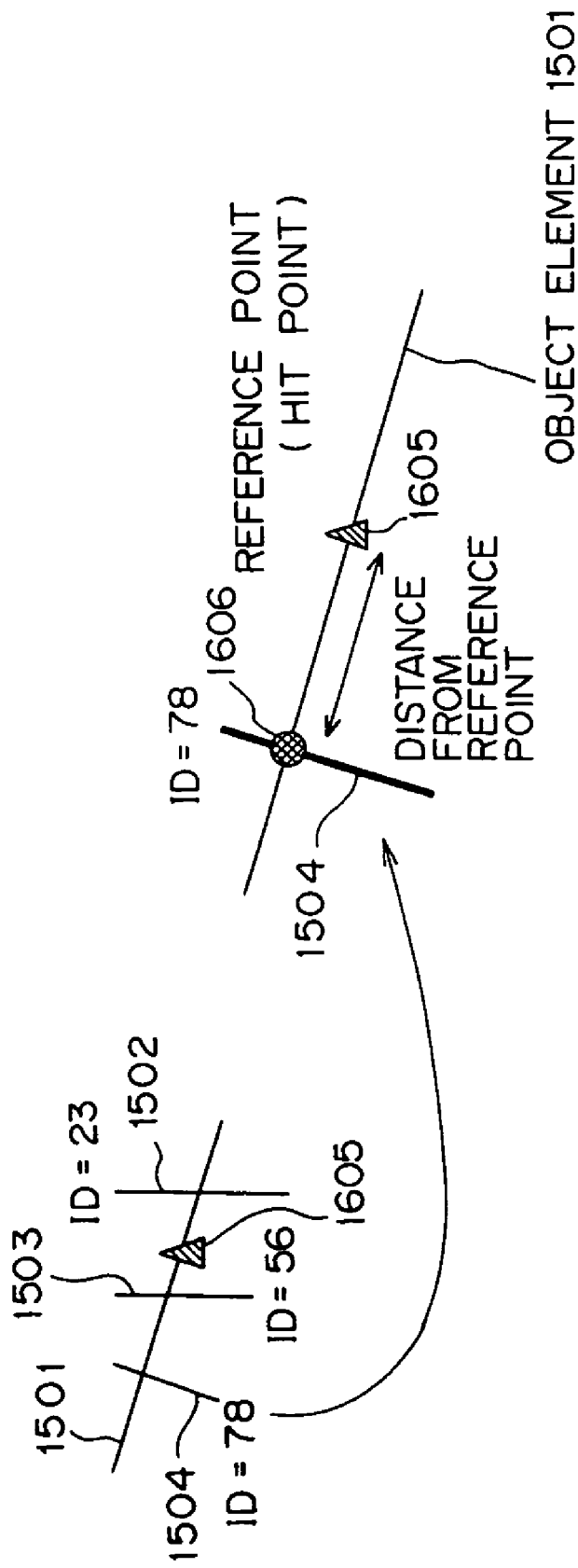
FIG. 19 is a diagram showing a distance from a reference point.

FIG. 19 is a diagram showing a distance from a reference point.

In the figure, a distance between a reference point (hit point) 1605 on the object element 1501 and an intersection 1606 with a figure element 1504 which is assigned crossed branch ID 78 is registered in item "distance from reference point" in Table 6.

Hereinafter, the reference point and the direction will be explained in detail using FIGS. 20 and 21.

Figure 20:
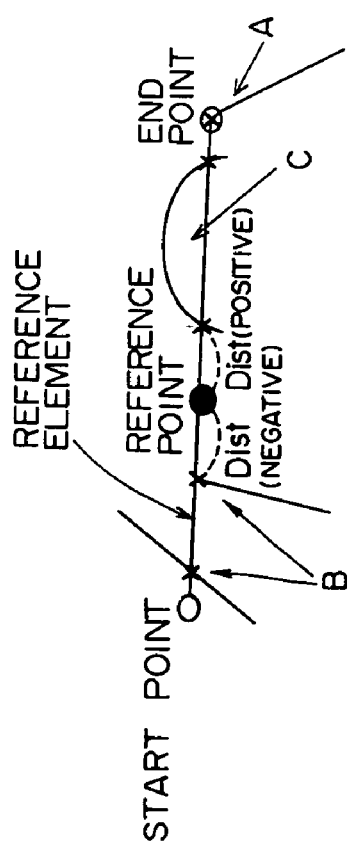
FIG. 20 is a diagram showing the respective types of information about a reference element when the reference element is a straight line.

FIG. 20 is a diagram explaining various kinds of information about a reference element in the case where the element is a straight line.

In FIG. 20, a start side observed from a reference point on the reference element is a negative direction. In the negative direction, two figure elements are connected or crossed with the reference element at a point (1) which is located at a distance Dist (negative) from the reference point, and at the other point (2) further in the negative direction, under the crossed state (B). An end point side observed from a reference point on the reference element is a positive direction. In the positive direction, an arc-shaped figure element is connected or crossed with the reference element at a point (1) which is located at a distance Dist (positive) from the reference point, and at the other point (2) further in the positive direction, under the end-connected state (A).

Figure 21:
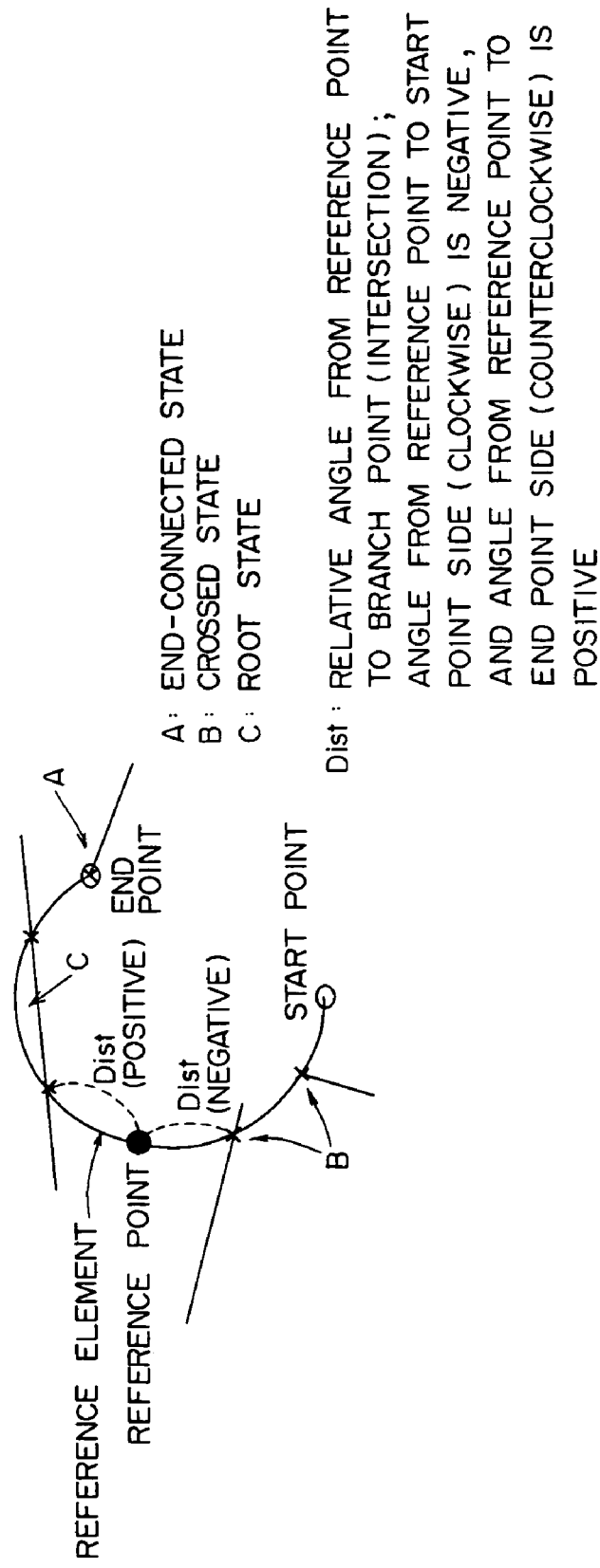
FIG. 21 is a diagram showing the respective types of information about a reference element when the reference element is an arc.

FIG. 21 is a diagram showing the various kinds of information about a reference element when it is an arc.

In FIG. 21, a start point side observed from a reference point on the reference element is a negative direction. In the negative direction, two figure elements are connected or crossed with the reference element at a point (1) which is located at a distance Dist (negative) from the reference point and at the other point (2) further in the negative direction, under the crossed state (B). Further, an end point side observed from the reference point on the reference element is a positive direction. In the positive direction, the figure element of a straight line is connected or crossed with the reference element at a point (1) which is located at a distance Dist (positive) from the reference point, and at the other point (2) further in the positive direction, under the root-shaped state (C). Still further, at the end of the positive direction, another figure element is connected with the reference element under the end-connected state (A).

The distance from the reference point is not limited to the shortest distance or the actual distance. Therefore, the distance can be represented by another index. That is, any index is available if the distance between the two crossed points can be uniformly determined. For example, if the reference element is a circle or arc, the index can be a center angle (relative angle).

FIG. 22 is a Table 7 showing data arrangement.

Table 7 registers the number of generations (generation) of branches retrieved by the branch retrieval unit 121, the number (branch number) of branches retrieved by the branch retrieval unit 121, and ID (branch ID) which is assigned to each of the branches. When a branch linked with the reference element is hierarchically retrieved setting the reference element as the highest hierarchy, in such a way that the branch retrieval unit 121 retrieves a branch connected with the reference element (or regarded as connected), and further retrieves the next branch connected with the retrieved branch, the generation represents a hierarchical position from the reference element to the linked branch.

Figure 23:
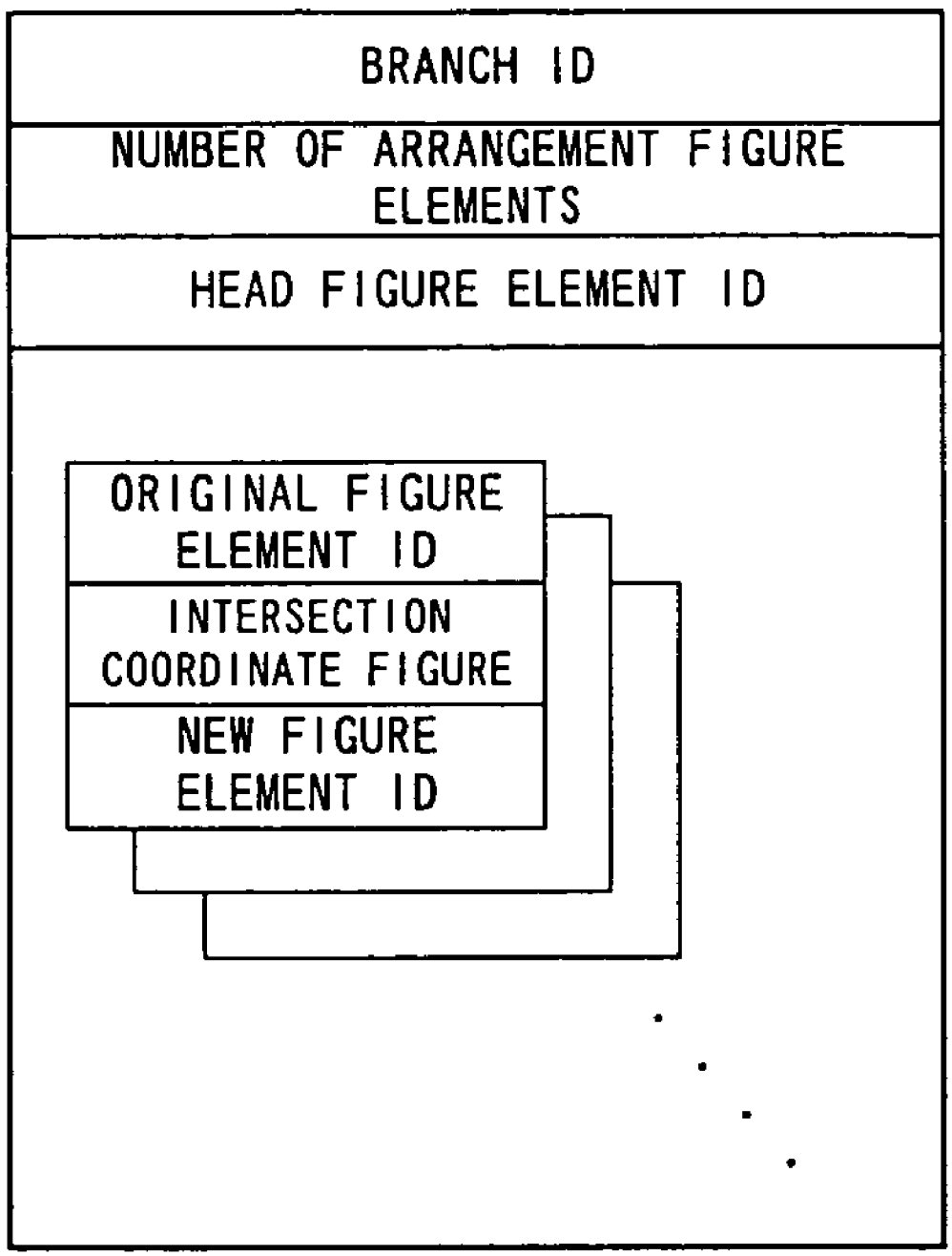
FIG. 23 is a table 8 showing data arrangement.

FIG. 23 is a Table 8 showing data arrangement.

Table 8 registers detailed information about the respective branches registered in Table 7. The Table registers the following:

(1) the ID (branch ID) of each of the branches registered in Table 7;

(2) the number (arrangement figure element number) of figure elements arranging these branches;

(3) the ID (head figure element ID) of a figure element which is located at the head of the hierarchy;

(4) a pointer (original figure element ID) to (i) the ID of a figure element retrieved by the branch element retrieval unit 210, which is stored in the figure element storage DB 114, and (ii) the figure element ID in Table 1;

(5) a coordinate value (intersection coordinate value) where branches cross with each other; and (6) the ID (new figure element ID) of a newly generated figure element after being corrected by the shape-corrected branch element retrieval unit 213.

Figure 24:
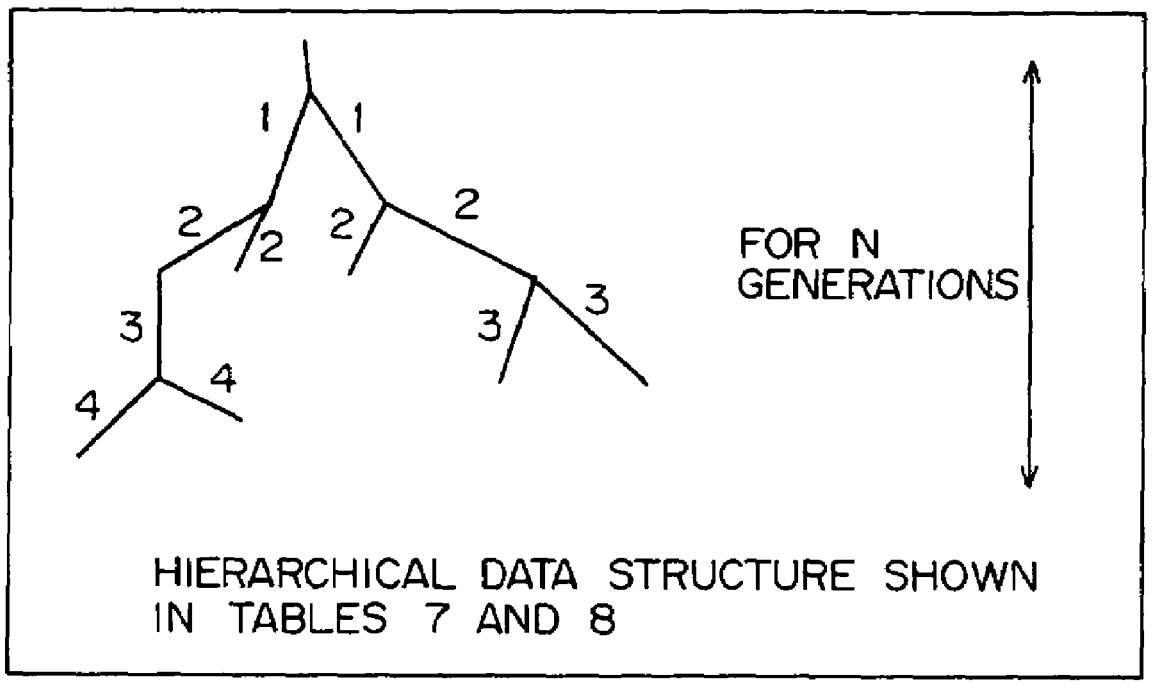
FIG. 24 is a diagram showing a model of branch arrangement.

FIG. 24 is a diagram showing a model of branch arrangement.

The example shown in FIG. 24 is for retrieval for four generations, and data about the respective branches are registered in Tables 7 and 8.

FIG. 25 is a Table 9 showing data arrangement.

Table 9 registers information about the figure element (branch) retrieved by the end-connected-element retrieval unit 212, and more specifically registers (1) the ID (head end-connected figure element ID) of a head figure element which is connected under the end-connected state, (2) the number (end-connected branch number) of figure elements (branches) connected under the end-connected state, and (3) the ID (branch ID) of each of the figure elements (branches) connected under the end-connected state.

Figure 26:
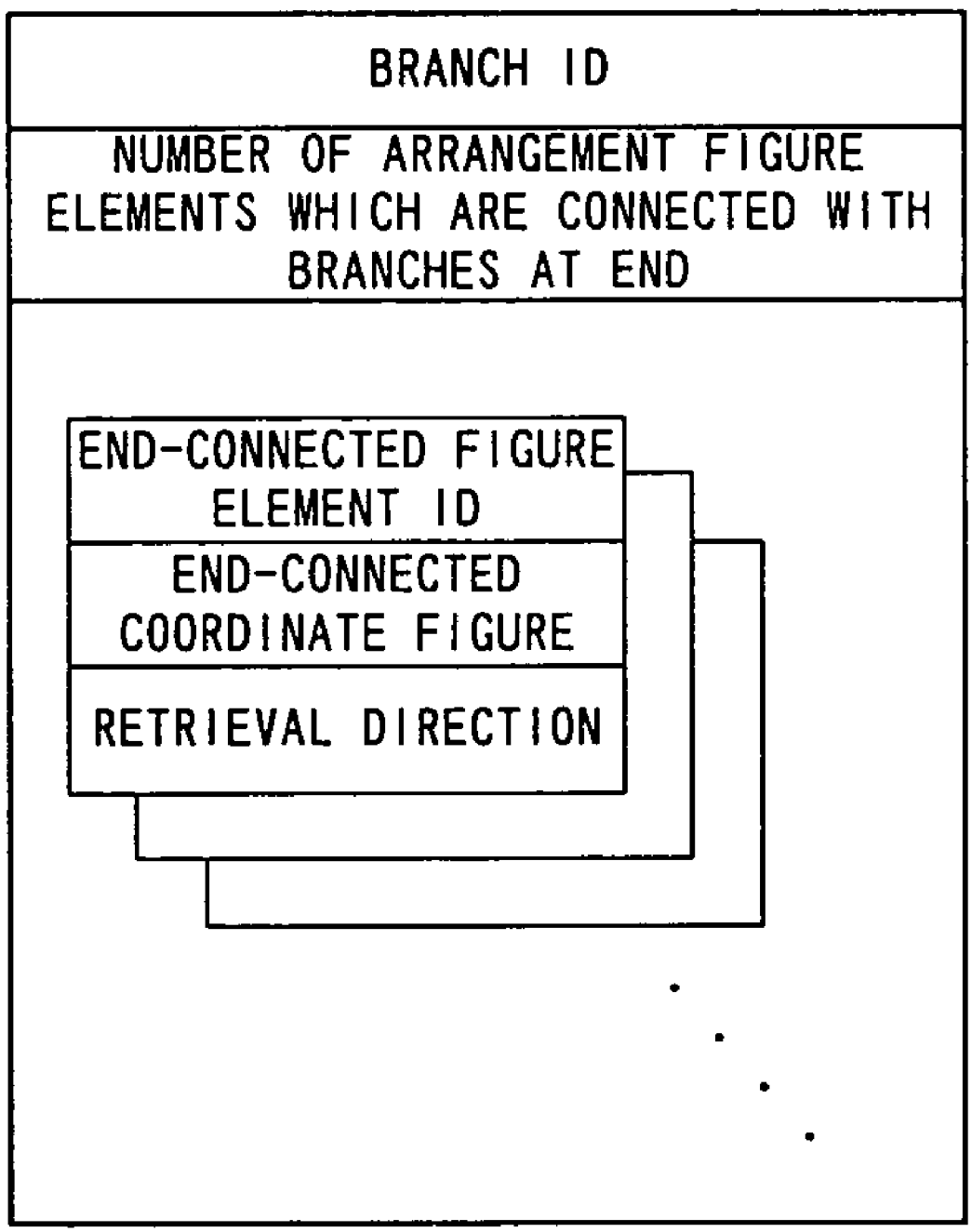
FIG. 26 is a table 10 showing data arrangement.

FIG. 26 is a Table 10 showing data arrangement.

Table 10 registers detailed information about the respective branches registered in Table 9, and more specifically registers (1) the ID (branch ID) of each of the branches registered in Table 9, (2) the arrangement number of figure elements connected with the branch under the end-connected state (the number of arrangement figure elements for end-connected branch), and (3) the ID (connected-figure-element ID) of each of the arrangement figure elements, (4) the coordinate value (connection coordinate value) of an intersection having the end-connected state, and (5) the direction (retrieval direction) where the end-connected-element retrieval unit 212 performs a retrieval process.

Figure 27:
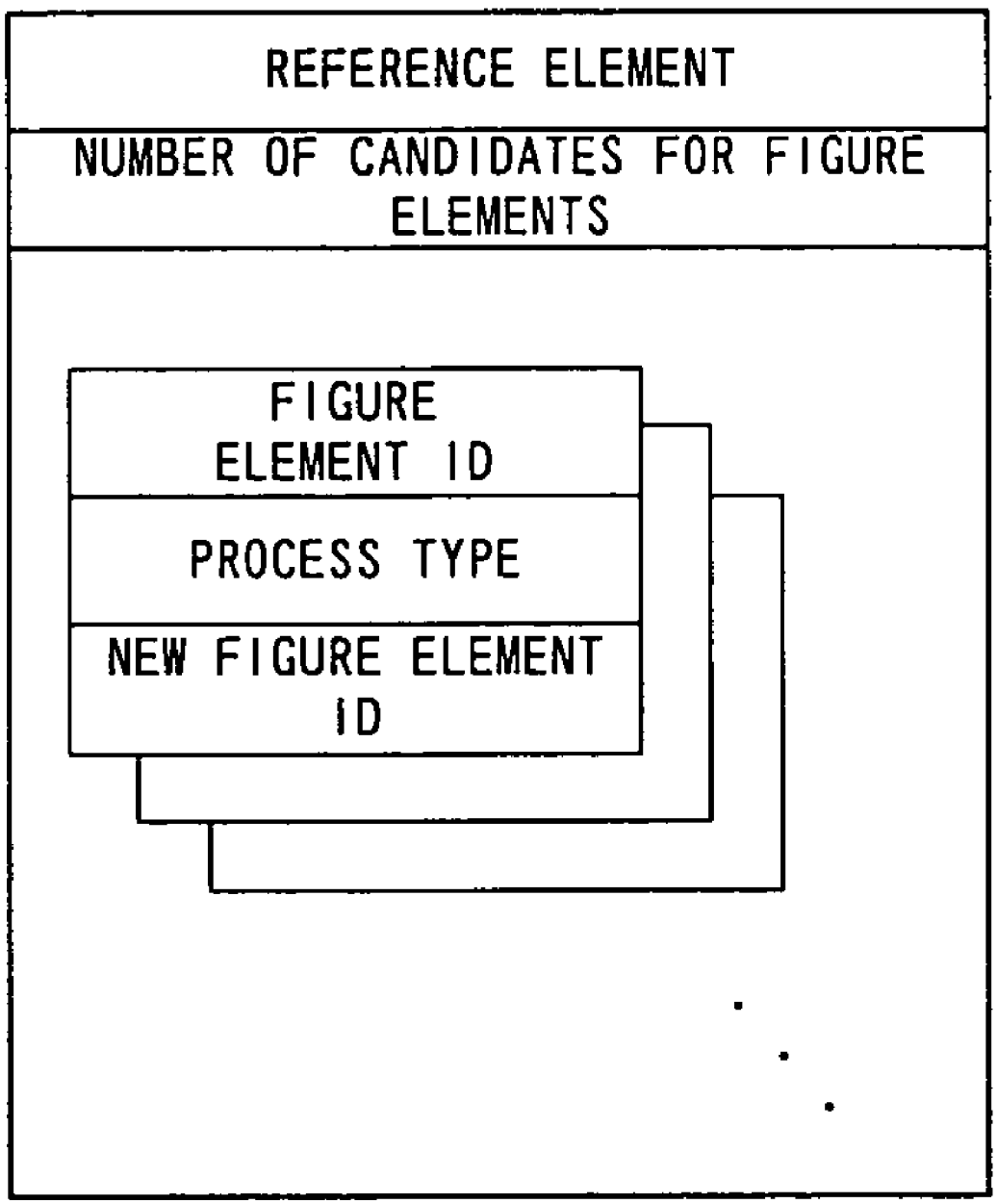
FIG. 27 is a table 11 showing data arrangement.

FIG. 27 is a Table 11 showing data arrangement.

Table 11 registers information about the figure element which is retrieved and corrected by the shape-corrected branch element retrieval unit 213, the element-to-be-trimmed retrieval unit 214, the connected element retrieval unit 215, or the within-error-range-element retrieval unit 216. More specifically, the Table registers the following:

(1) the ID (reference element) of the figure element registered in item "new figure element ID" of Table 2 when the retrieval and correction process is performed;

(2) the number (candidate element number) of candidates for the branches of a continuous-line group, which are obtained by the retrieval and correction process; and (3) the ID (figure element ID) of each of the respective figure elements determined as candidates, which is stored in the figure element storage DB 114;

(4) a retrieval and correction type (process type) selected among the element-to-be-trimmed retrieval process, the connected-element retrieval process, and within-error-range-element retrieval process; and (5) the ID (new figure element ID) of a figure element which has been retrieved and corrected.

Figure 28:
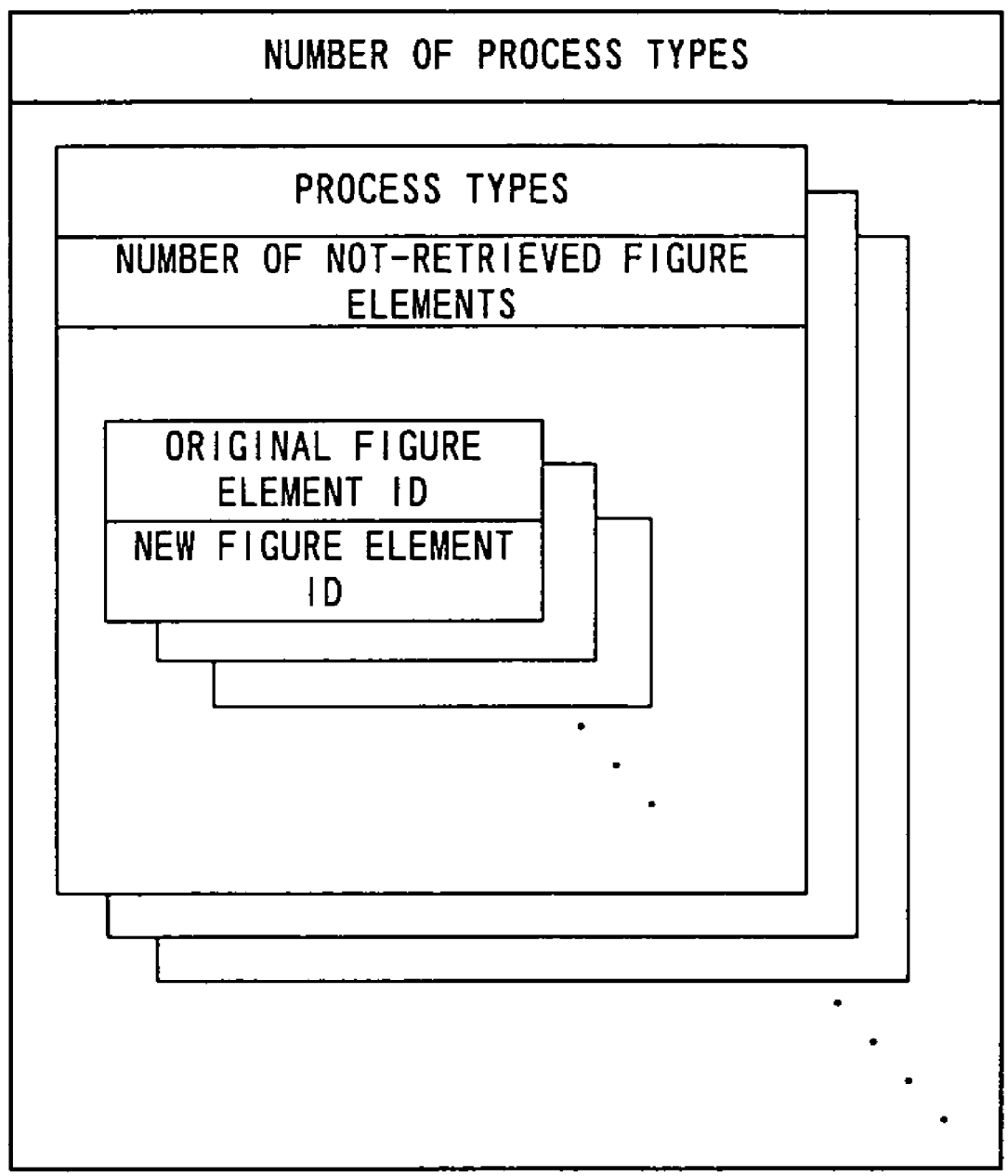
FIG. 28 is a table 12 showing data arrangement.

FIG. 28 is a Table 12 showing data arrangement.

When the number of figure elements is decreased by the retrieval and correction process of the shape-corrected branch element retrieval unit 213 or the connected-element retrieval unit 215, the Table functions as a check table for determining the retrieved and corrected figure elements as those not to be retrieved, so that these figure elements are not retrieved again in the middle of the retrieval process. The Table registers (1) the number of types of the retrieval and correction processes (retrieval process type number), (2) a type of retrieval and correction process to be used when figure elements are retrieved, (3) the number of figure elements not to be retrieved by the respective retrieval and correction process (excepted element number), (4) the ID (original figure element ID) of each of the figure elements not to be retrieved, which is stored in the figure element storage DB 114, and (5) a pointer (new figure element ID) to the new ID of each of the figure elements which are corrected by the retrieval and correction process identical to the process described in item (3) or new figure element ID in Table 2.

Figure 29:
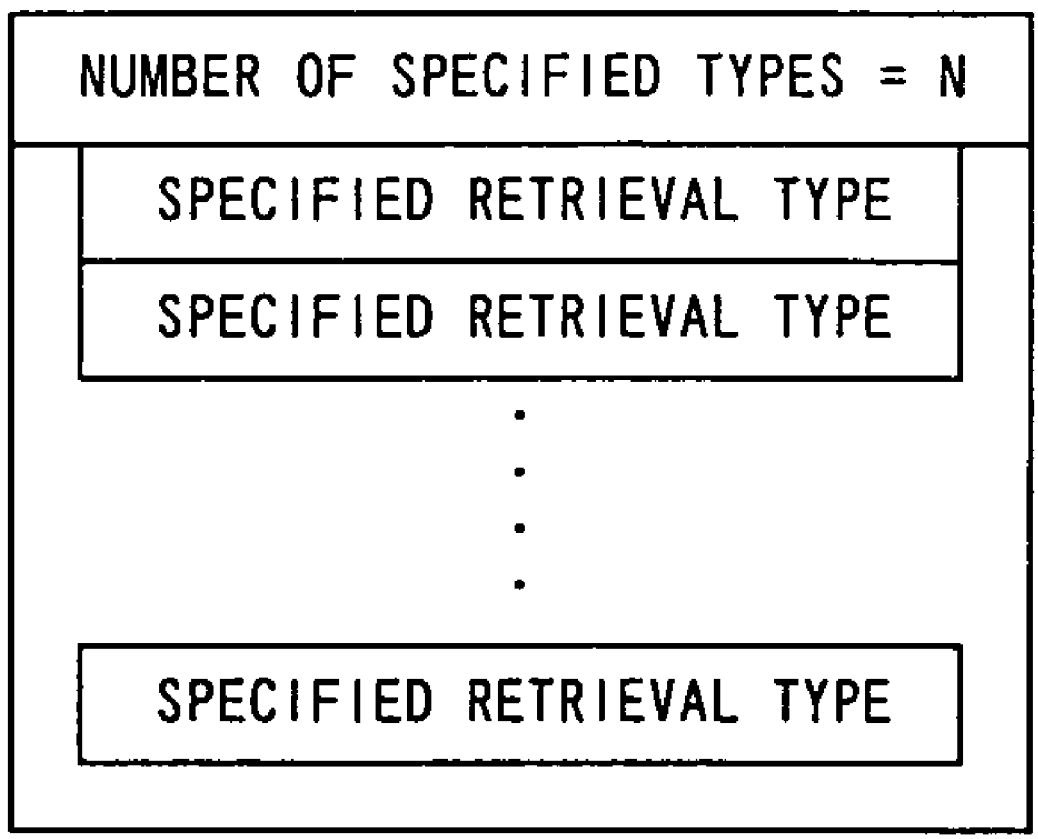
FIG. 29 is a table 13 showing data arrangement.

FIG. 29 is a Table 13 showing data arrangement.

The Table registers information about the type of figure elements, and is used for specifying the type of figure elements to be retrieved. More specifically, the Table registers (1) the number of types of figure elements to be specified and retrieved (specified type number), and (2) the respective types of figure elements (specified retrieval type) stored in the figure element storage DB 114 such as a line, line width, figure element/drawing element, layer and the like.

Figure 30:
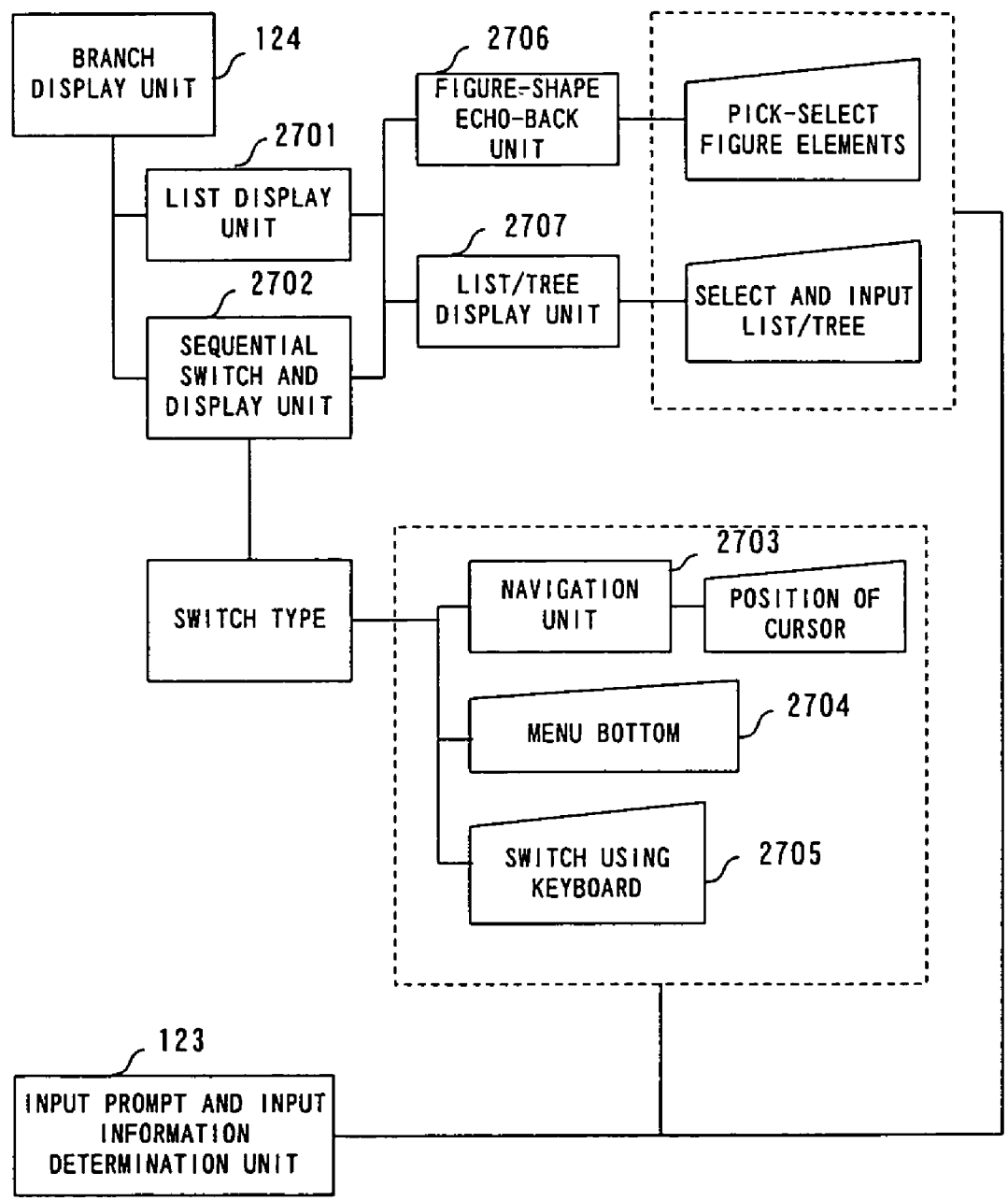
FIG. 30 is a diagram showing the function arrangement of a branch display unit 124.

FIG. 30 is diagram showing the function arrangement of a branch display unit 124.

In FIG. 30, the branch display unit 124 is provided with a function for list-displaying the branches (a list-display unit 2701), and a function for sequential switching branches to be displayed (the sequential switch and display unit 2702). The sequential switch and display unit 2702 is provided with a navigation function for activating the neighborhood of a cursor (a navigation unit 2703), a function for a menu button (the menu bottom 2704), and a function for switching branches using a keyboard (the switch using keyboard 2705). The list-display unit 2701 or the sequential switch and display unit 2702 is provided with an echo-back display function by pick-selecting branches using a mouse or the like (figure-shape echo back unit 2706), and a function for displaying a list/tree structure for selecting an arbitrary figure element in a list/tree structure (a list/tree display 2707).

Hereinafter, a flow of extracting the continuous-line-group will be explained with reference to FIGS. 31 to 44. At the beginning of the continuous-line-group extraction process, a figure (drawing) formed by figure elements stored in the figure element storage DB 114 has been displayed on the figure display unit 113 of a figure process system 110.

Figure 31:
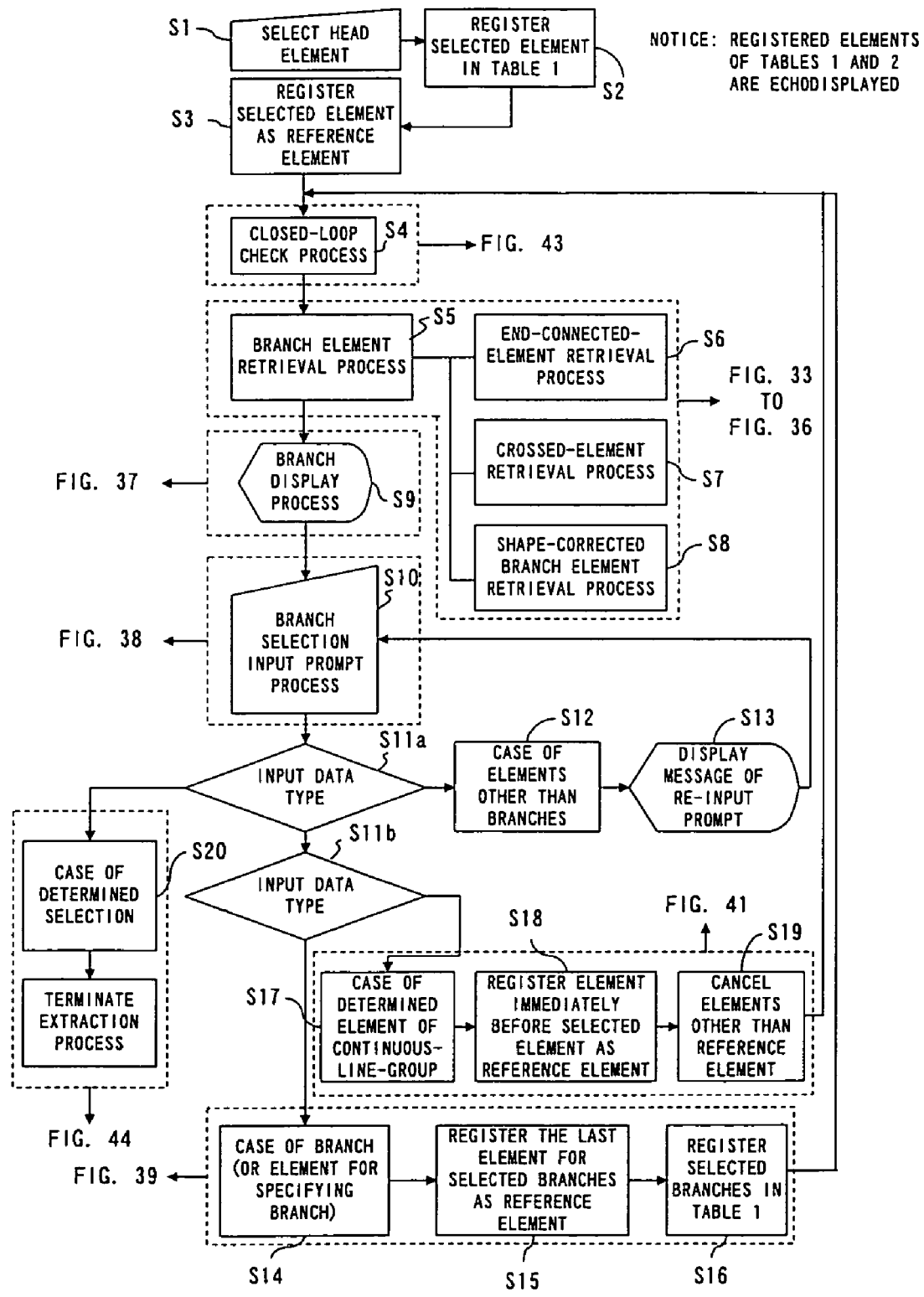
FIG. 31 is a main flowchart of a continuous-line-group extraction process.

FIG. 31 is a main flowchart of a continuous-line-group extraction process.

In step S1 of FIG. 31, an operator designates the head of the figure elements displayed on a display for extracting a continuous-line-group. In Step 2, 1 is registered in item "registered element number" of Table 1 as information about the figure element selected in Step 1, and the ID of the selected figure element, which is stored in the figure element storage DB 114 is registered in item "figure element ID" of Table 1. In step S3, the ID of the figure element (figure element ID), which is registered in Table 3 in step S2 and which is stored in the figure element storage DB 114, and the coordinate value at the time of designating the figure element, are registered.

FIG. 32 is a diagram showing a table registration process when a first figure element is selected.

In this figure, the figure element ID designated in step S1 and its coordinate value are registered in Table 3, but no data is inputted in Table 4.

Here, the explanation returns to the flowchart shown in FIG. 31. In step S4, a closed-loop check unit 230 performs a closed-loop process. The detailed explanation will be described later in reference to FIG. 43.

Figure 33:
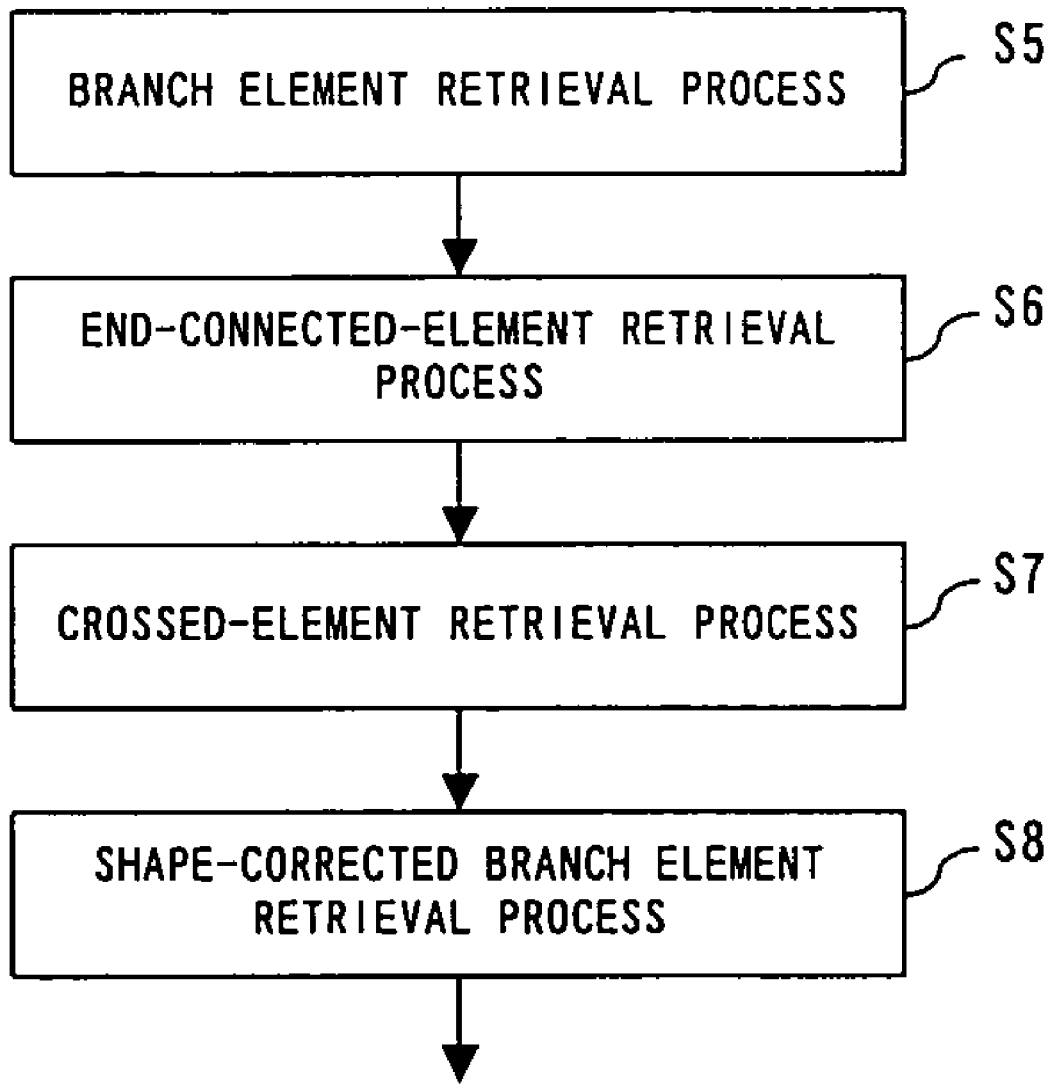
FIG. 33 is a flowchart of a branch retrieval process.

FIG. 33 illustrates branch element retrieval process, S5, shown in FIG. 31. In step S5, the branch element retrieval unit 210 performs a branch element retrieval process. In the branch element retrieval process, the end-connected-element retrieval process (step S6), the crossed-element retrieval process (step S7), and the shape-corrected branch element retrieval process (step S8) are sequentially performed as shown in FIG. 33. The end-connected-element retrieval unit 212 performs the end-connected-element retrieval process (step S6), the crossed-element retrieval unit 211 performs the crossed-element retrieval process (step S7), and the shape-corrected branch element retrieval unit 213 performs the shape-corrected branch element retrieval process (step S8).

Figure 34:
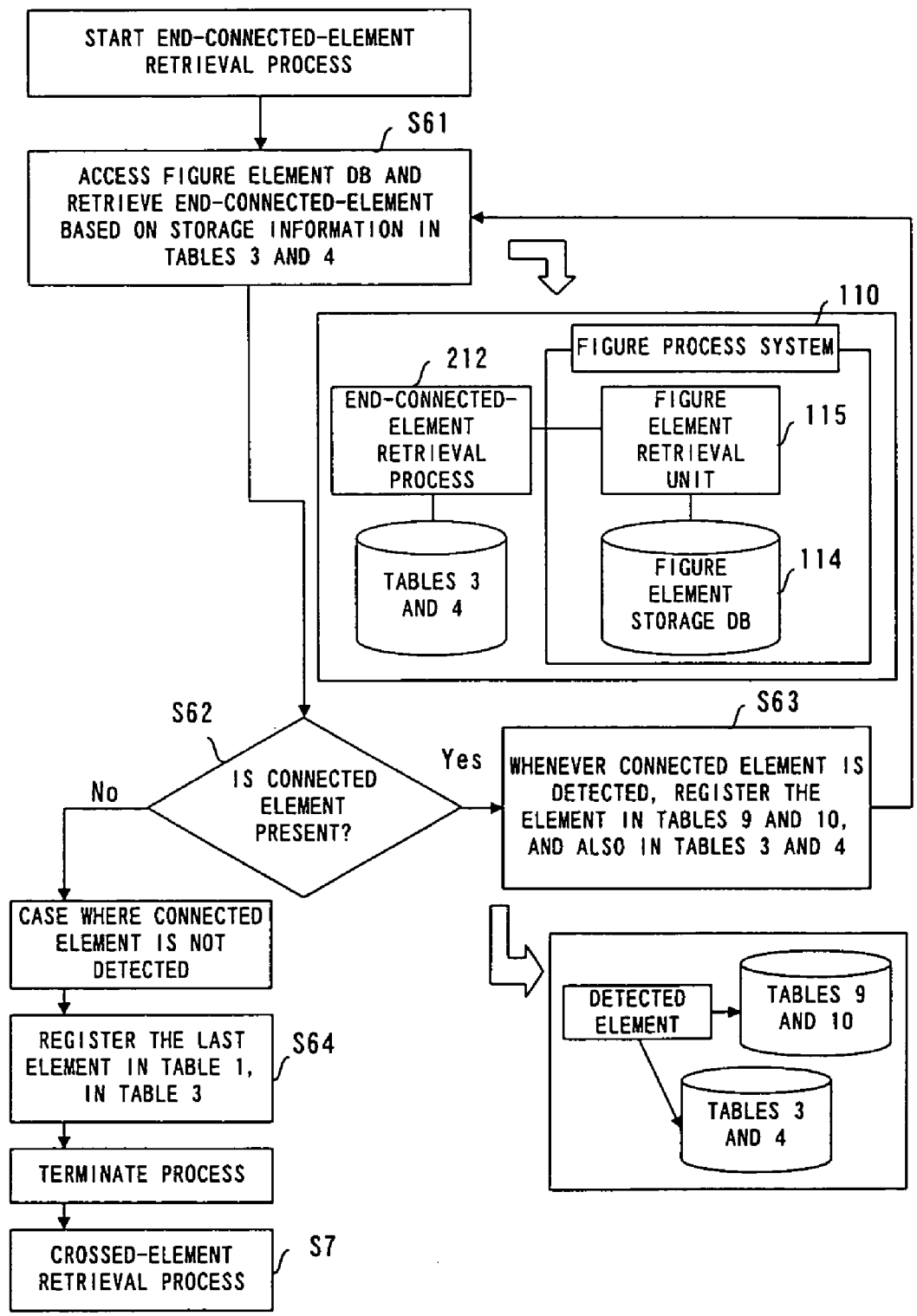
FIG. 34 is a flowchart of an end-connected-element retrieval process.
Figure 35:
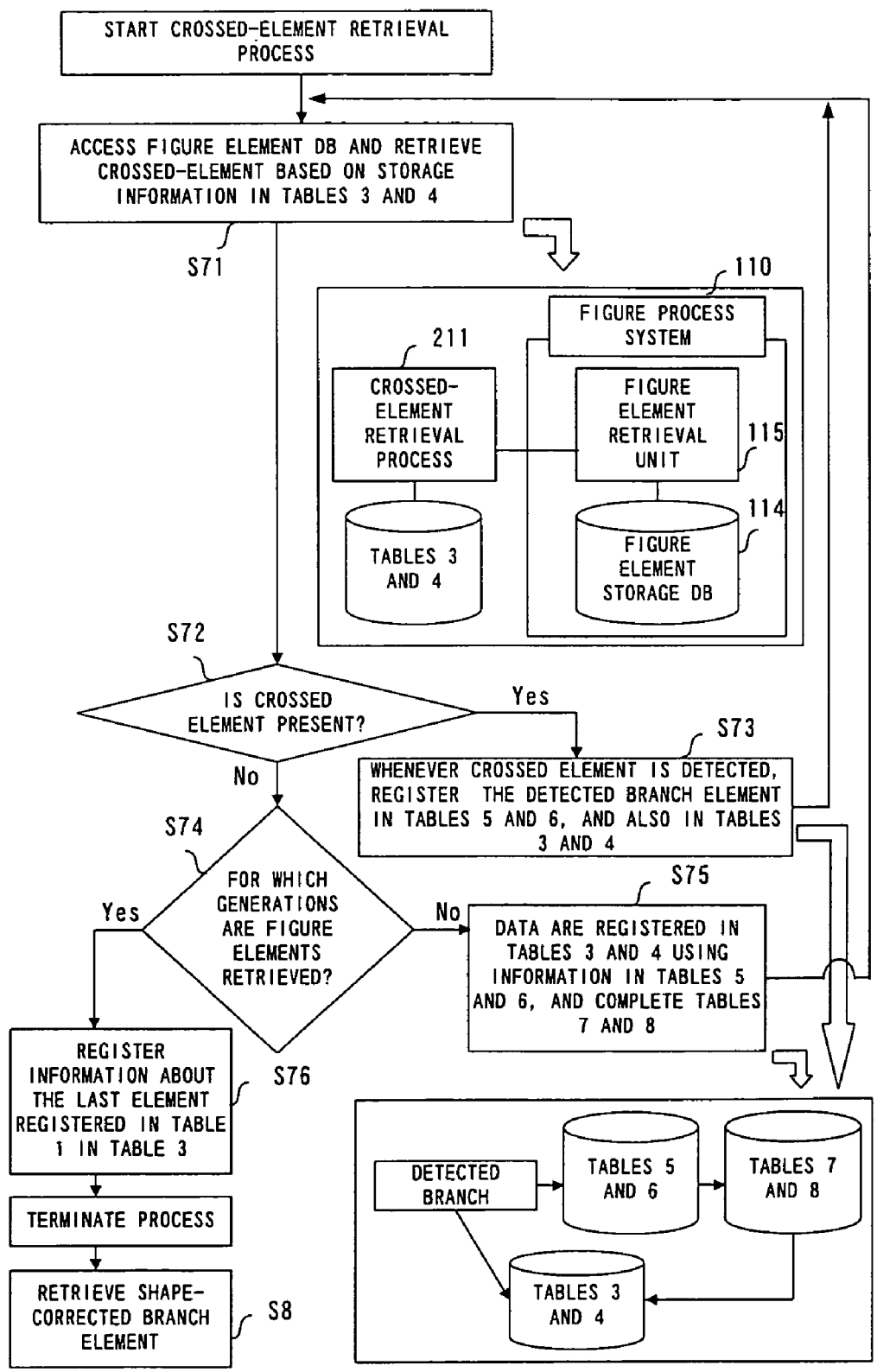
FIG. 35 is a flowchart of the crossed-element retrieval process.
Figure 36:
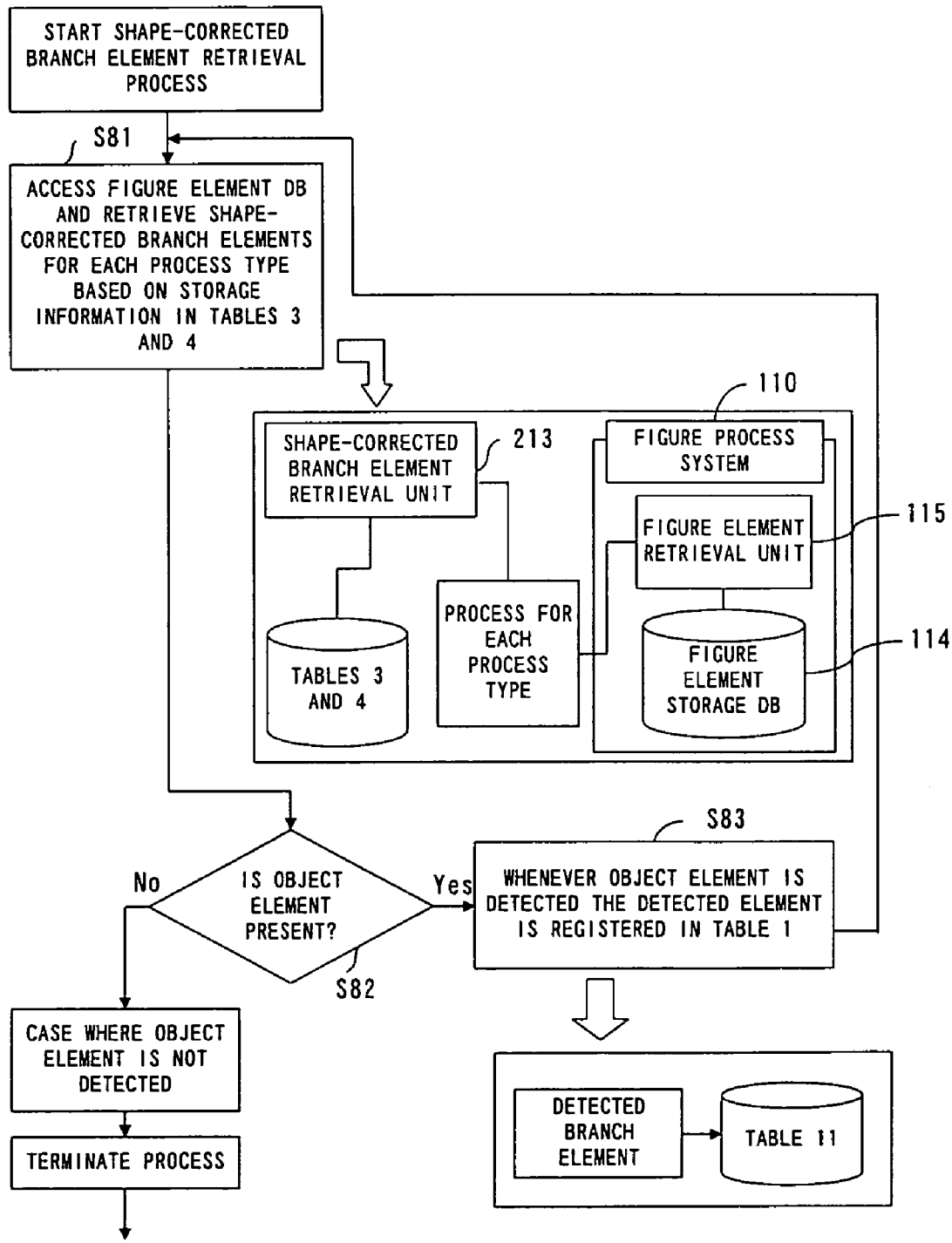
FIG. 36 is a flowchart of a shape-corrected branch element retrieval process.

The respective above-mentioned retrieval processes are explained by referencing to FIGS. 34 to 36.

FIG. 34 is a flowchart of the end-connected-element retrieval process. In step S61 of FIG. 34, the end-connected-element retrieval unit 212 accesses the figure element storage DB 114 based on the information about a reference element, which is registered in Tables 3 and 4 of the retrieval candidate storage DB 122. Then, the unit retrieves figure elements which are connected with the reference element under the end-connected state. In step S62, when a figure element which is connected with the reference element under the end-connected state, is detected (step S62: Yes), information about the detected figure element is registered as new information about the reference element in Tables 3 and 4, and Tables 9 and 10, in step S62. However, in the case where a figure element which is connected with the reference element under the end-connected state is not detected in step S62 (step S62: No), in step S64, the ID (Nth ID) of the last figure element registered in Table 1 is registered in Table 3 as new information about the reference element. Then, the flow moves to the crossed-element retrieval process in step 7.

FIG. 35 is a flowchart of the crossed-element retrieval process.

In step S71 of FIG. 35, based on the information about the reference element, which is registered in Tables 3 and 4 of the retrieval candidate storage DB 122, the end-connected-element retrieval unit 211 accesses the figure element storage DB 114, and then retrieves figure elements which cross the reference element. In step S72, when a figure element which crosses the reference element under the end-connected state, is detected (step S72: Yes), information about the detected figure element is registered in Tables 3 and 4, and also in Tables 5 and 6, in step S73. However, when a figure element which crosses the reference element under the end-crossed state is not detected in step S72 (step S72: No), it is determined in step S74 whether or not branches are retrieved up to a predetermined Nth generation which is registered in Table 7. In the case where it is determined in step S74 that branches are not retrieved up to the Nth generation registered in Table 7 (step S74: No), in step S75, new information about the reference element is registered in Tables 3 and 4 based on the information in Tables 5 and 6, and the new information is also registered in Tables 7 and 8 based on the information in Tables 7 and 8. When it is determined in step S74 that branches are retrieved up to the Nth generation registered in Table 7 (step S74: Yes), ID of the last figure element (Nth) registered in Table 1 is registered in Table 3, in step S77. Then, the flow moves to the shape-corrected branch element retrieval process described in step S8.

FIG. 36 is a flowchart of the shape-corrected branch element retrieval process.

In step S81 of FIG. 36, the shape-corrected branch element process unit 213 accesses the figure element storage DB 114 for each retrieval type such as the element-to-be-trimmed retrieval process, the connected-element retrieval process, or the like, and retrieves a figure element which is a candidate for connection after it has been corrected, based on the information registered in Tables 3 and 4 of the retrieval candidate storage DB 122. In step S82, when such a figure element is detected (step S82: Yes), information about the detected figure element is registered in Table 11 in step S83, and the flow returns to step S81 again.

In step S82, when a figure element which is a candidate for connection after corrected is not detected (step S82: No), the flow advances to a next process.

Next is an explanation of the flowchart shown in FIG. 31. In step S9, a branch display process for displaying branches retrieved by the respective retrieval processes is performed.

Figure 37:
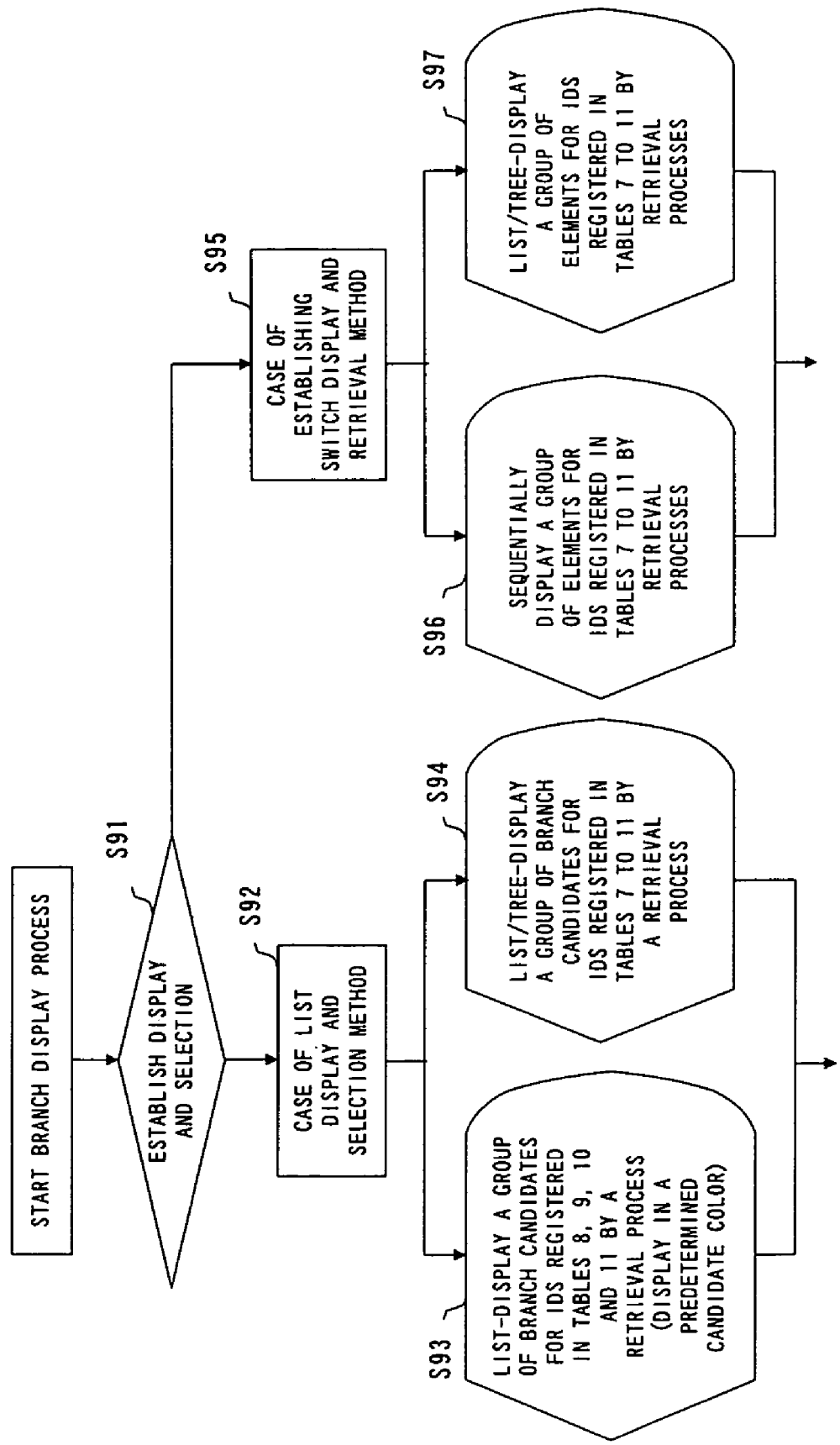
FIG. 37 is a flowchart of a branch display process.

FIG. 37 is a flowchart of a branch display process.

In step S91 of FIG. 37, a display method of branches designated by an operator is determined. In the case of a list-display and selection method (step S92), the branch display unit 124 list-displays (step S93) or list/tree-displays (step S94) all the branches retrieved by the respective retrieval processes, in a predetermined color (candidate color), based on the information registered in Tables 7 to 11. In the case of a switch display and retrieval method (step S95), the branch display unit 124 sequentially displays (step S96) or list/tree-displays (step S97) the branches retrieved by the respective retrieval processes, based on the information registered in Tables 7 to 11.

The explanation will return to the flowchart of FIG. 31. In step S10, in order to select the branches displayed by the branch display process, the branch selection prompt process is performed for the operator. The figure selection system 100 is under a waiting state corresponding to a display method determined by the branch display process.

Figure 38:
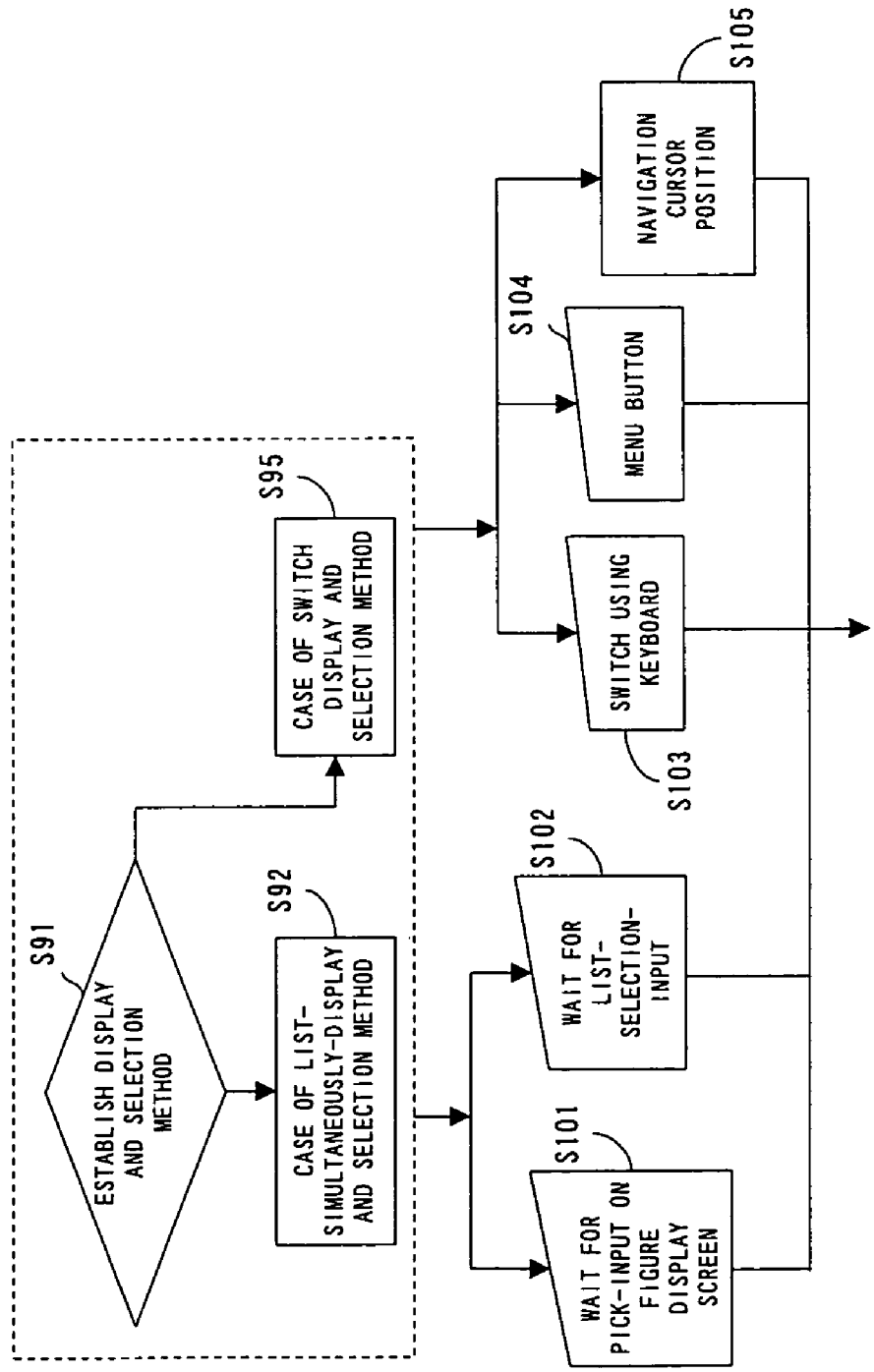
FIG. 38 is a flowchart of a branch selection promotion process.

FIG. 38 is a flowchart of a branch selection prompt process.

In FIG. 38, when the list display in step S93 or the list/tree display in step S94 is displayed in the branch display process, the process will be in a state of waiting for the input of a pick-process of selecting a figure element using a mouse or the like (step S101) or a state of waiting for the input of a list process for selecting a list or a tree (step S102). When the sequential display in step S96 or the list/tree display in step S97 is displayed by the branch display process, the branch selection prompt process is performed by each function of a switch input process of sequentially switching displays of the respective branches using a keyboard (step S103), a menu button for switching the screens (step S104), and a navigation process for activating the neighborhood of a cursor (step S105).

The explanation returns to the flowchart of FIG. 31.

In steps S11a and S11b, the input information inputted in step S10 is determined. In the case where the inputted information is about figure elements other than a branch, that is, the information is about figure elements other than the figure elements determined in step S14, S17, or S20 described later (step S12), an error message to promote re-input is displayed (step S13), and the flow returns to the branch selection prompt process in step S10.

In the case where the information inputted in step S10 is about branches (or figure-element-specifying branches) (step S14), a branch determination process is performed.

Figure 39:
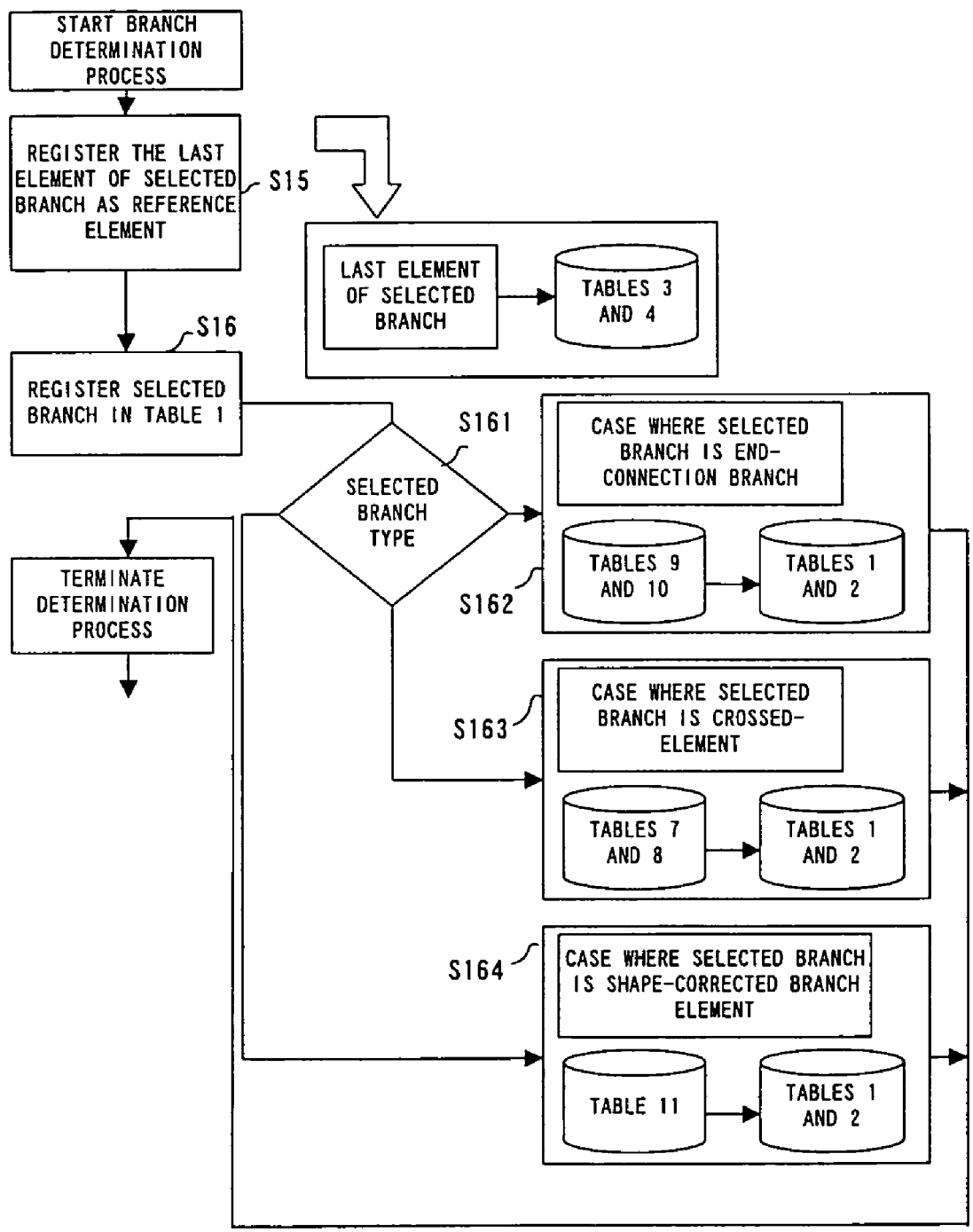
FIG. 39 is a flowchart of a branch determination process.

FIG. 39 is a flowchart of a branch determination process.

In FIG. 39, the branch element retrieval unit 210 registers the last figure element of a branch which is selected in step S15, as a reference element in Tables 3 and 4. Then, the unit registers the branch selected in Table 1, in step S16. The unit determines a type of the selected branch (step S161). In the case of an end-connected element (step S162), the unit registers the information registered in Tables 9 and 10, in Tables 1 and 2. In the case where a type of the selected branch is a crossed element (step S163), the unit registers the information registered in Tables 7 and 8, in Tables 1 and 2. In the case where a type of the selected branch is the shape-corrected branch element (step S161 and step S164), the unit registers the information registered in Tables 11, in Tables 1 and 2.

FIG. 40 is a diagram explaining the table registration process when a branch is designated (selected) in step S15.

As shown in FIG. 40, the figure element ID of the last figure element of a selected branch and its coordinate value are registered in Table 3. In Table 4, the retrieval direction is registered.

The explanation will return to the flowchart of FIG. 31. In the case where the information inputted in step S10 is about a figure element of the determined continuous-line-group (step S17), the trial and error support process is performed.

Figure 41:
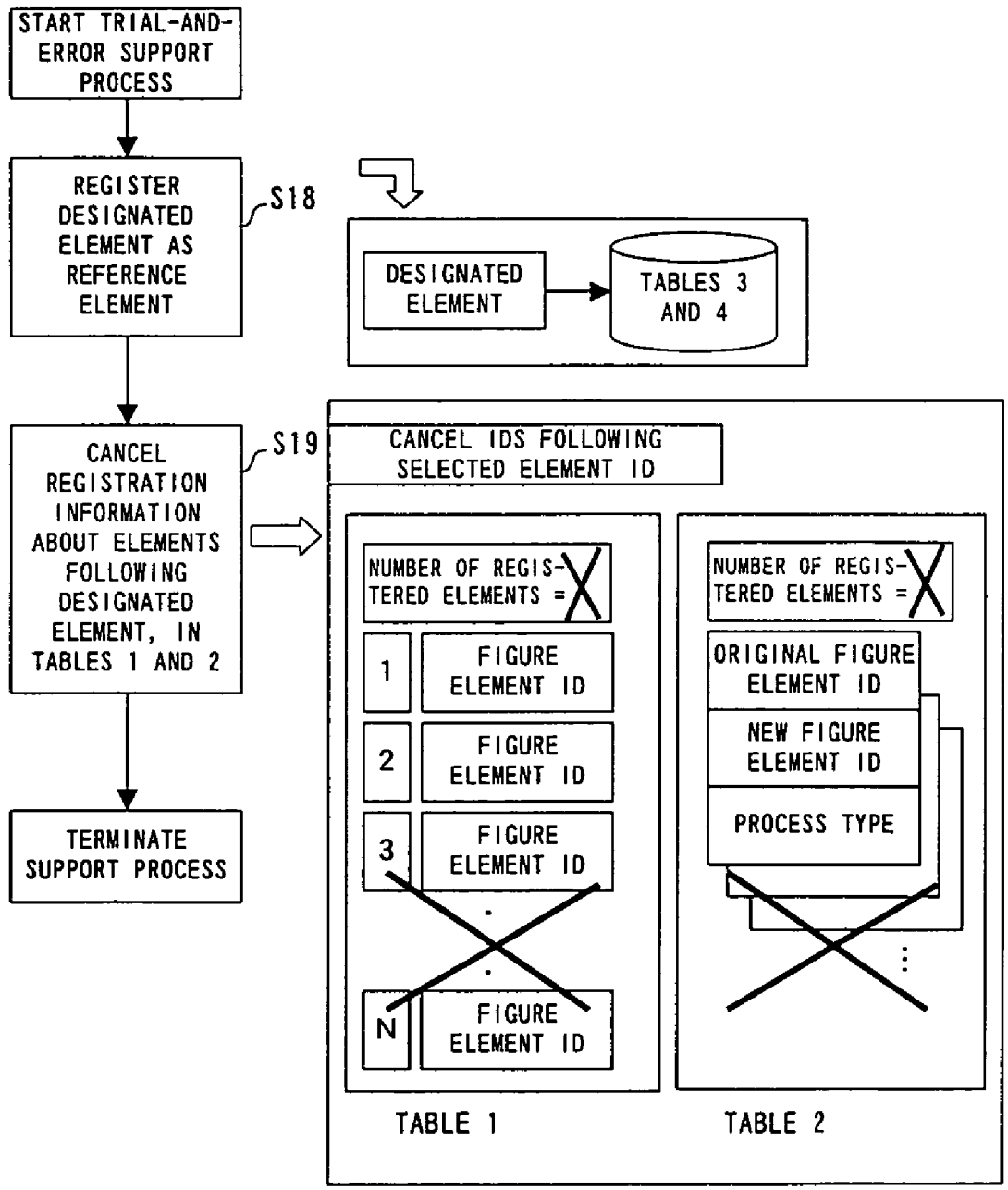
FIG. 41 is a flowchart of a trial-and-error support process.

FIG. 41 is a flowchart of a trial-and-error support process.

In FIG. 41, the trial-and-error support unit 220 registers a figure element immediately before the figure element designated (selected) in step S18, in Tables 3 and 4 as a reference element. Then, in step S19, the unit cancels (removes) the information about figure elements following the designated figure element from the information registered in Tables 1 and 2.

Figure 42:
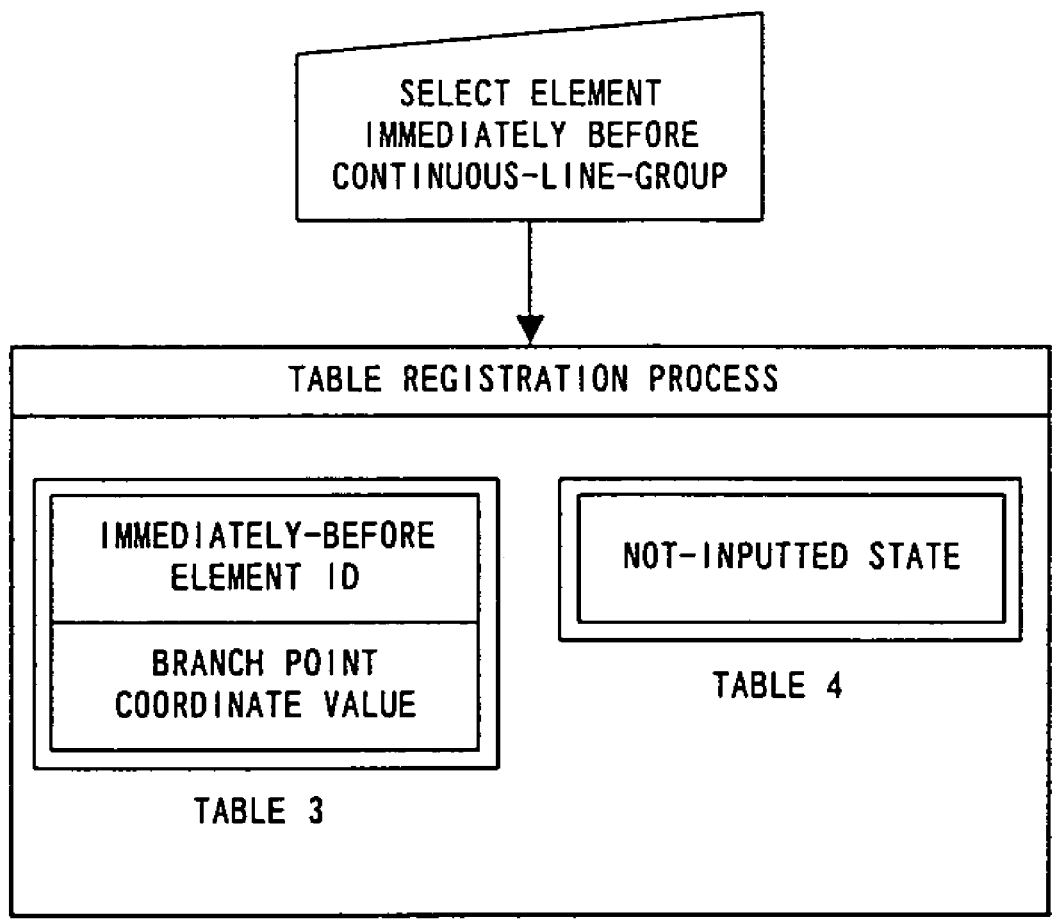
FIG. 42 is a diagram explaining the table registration process when a branch to be cancelled is designated.

FIG. 42 is a diagram explaining the table registration process when a branch to be cancelled is designated in step S18.

As shown in FIG. 42, the ID of a figure element immediately before the designated figure element and its coordinate value are registered in Table 3, and no data is inputted in Table 4.

The explanation will return to the flowchart of FIG. 31. After performing the process in step S16 or S19, the flow returns to the closed-loop check process in step S4.

FIG. 43 is a flowchart of the closed-check process.

The closed-loop check process is performed in such a way that the closed-loop check unit 230 checks whether or not the continuous-line-group extracted by the extraction process is loop-shaped when the continuous-line-group extraction process is repeated in the flow of FIG. 31.

In step S41 of FIG. 43, it is determined in step S16 whether or not the ID of the figure element registered in Table 1 is registered twice in Table 1. In the case of double registration (step S42), it is determined that a loop has been generated. Then, the notification message is displayed (step S43), an inquiry about the determination is displayed, and a process is in a state of waiting for the determination (step S44). When the determination is inputted (step S45 and step S46), the loop information is transmitted to a figure process system 110 (step S47), and the closed-loop check process terminates. In step S41, in the case where there is no double registration, it is determined that a loop has not been generated (step S48), and the closed-loop check process terminates.

The explanation will return to the flowchart of FIG. 31. When the information inputted in step S10 is "selection determination" (step S20), a termination process for terminating the continuous-line-group extraction process is performed.

Figure 44:
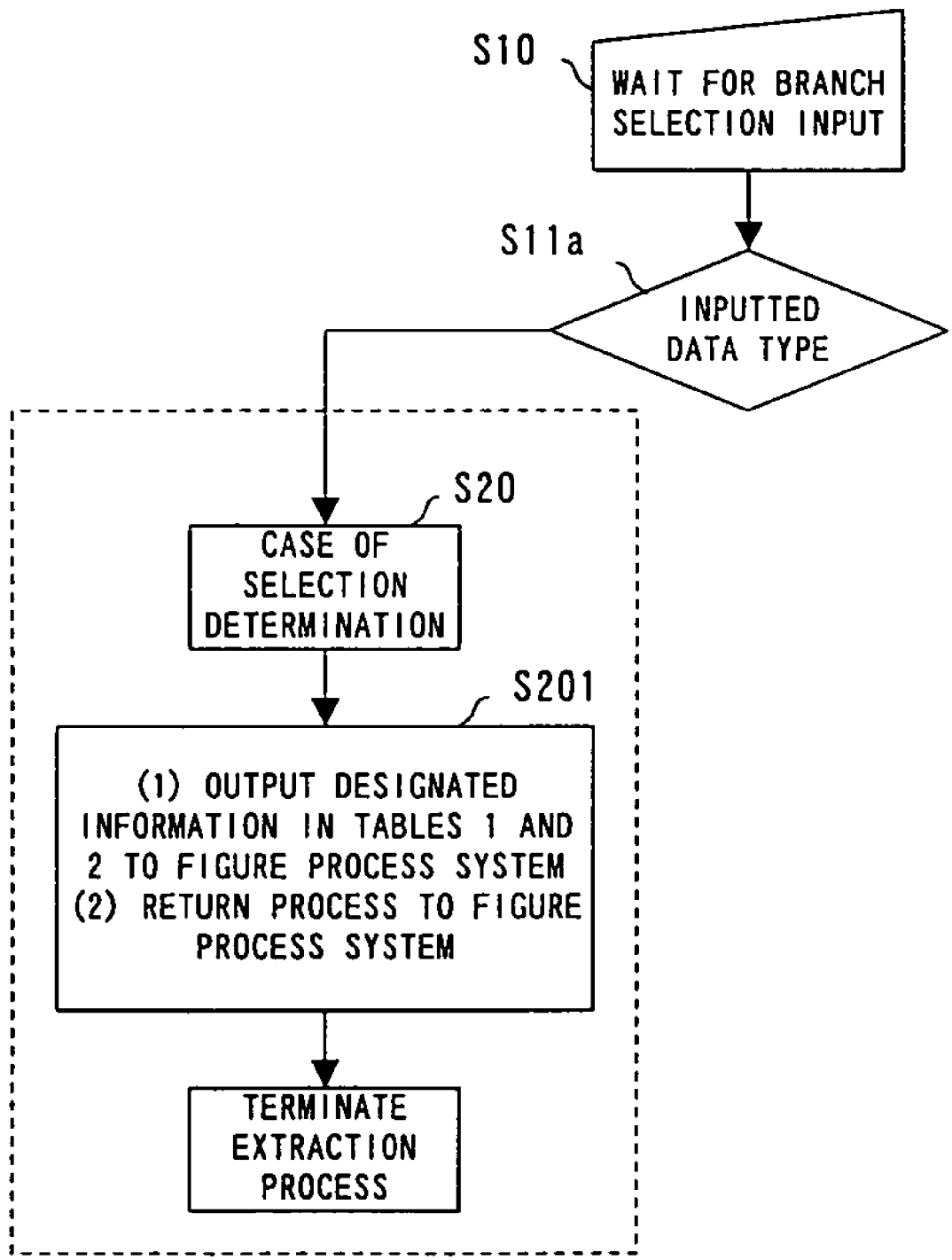
FIG. 44 is a flowchart of a termination process.

FIG. 44 is a flowchart of the termination process.

In FIG. 44, after step S20, the information which is stored in Tables 1 and 2 and which is under a condition where the extraction of a continuous-line-group is determined, is transmitted to the figure process system 110 in step 201. Then, the figure process system 110 performs a process, and all the continuous-line-group extraction processes terminate.

Next, the continuous-line-group extraction process will be specifically explained using some examples in reference to FIGS. 45 to 50.

Figure 45:
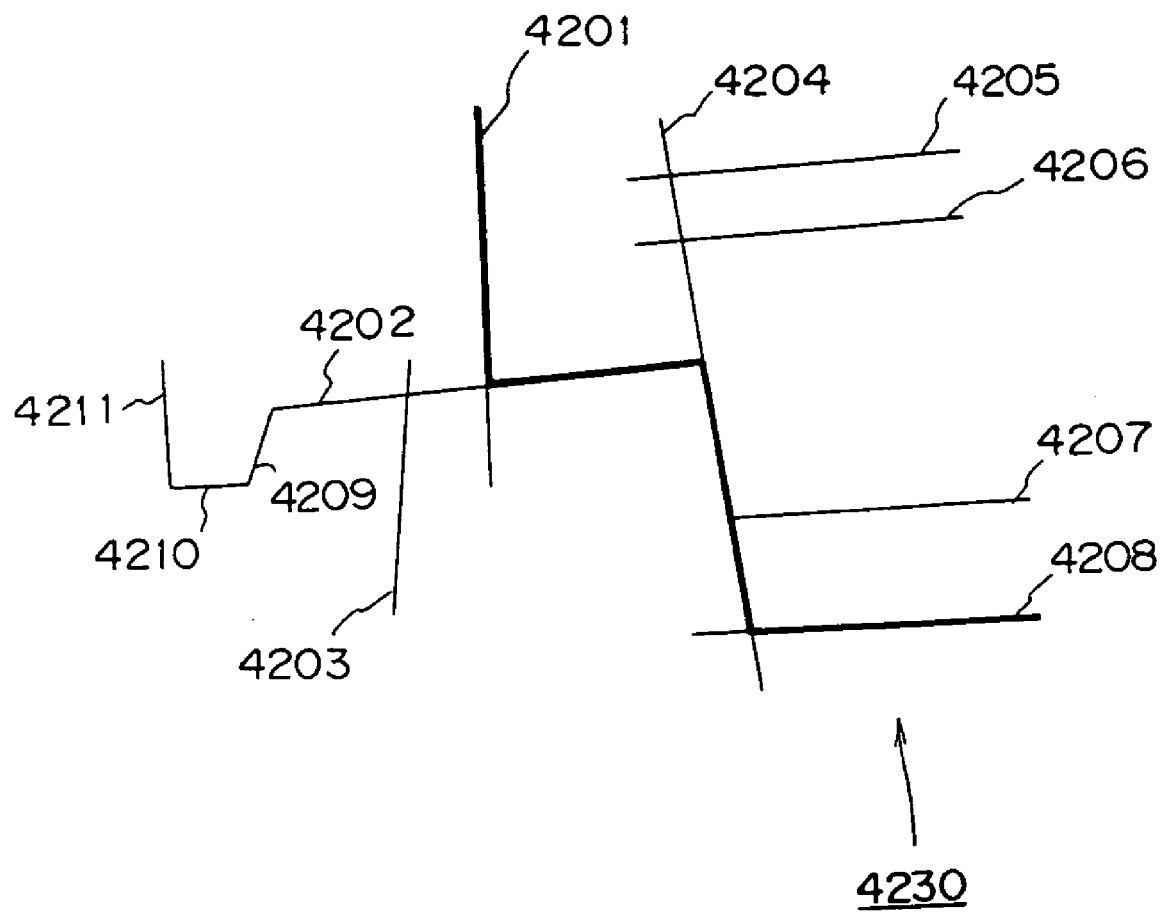
FIG. 45 is a display example (NO. 1) when the continuous-line-group extraction process is being performed.

In a figure in which 11 figure elements 4201, 4202, 4203, 4204, 4205, 4206, 4207, 4208, 4209, 4210 and 4211 are drawn as shown FIG. 45, the operation for an operator to select an arbitrarily desired figure 4230 and its display will be explained hereinafter. Assume that two generations have been determined to be displayed as candidate branches. That is, 2 is registered in item "generation" in Table 7.

Figure 46:
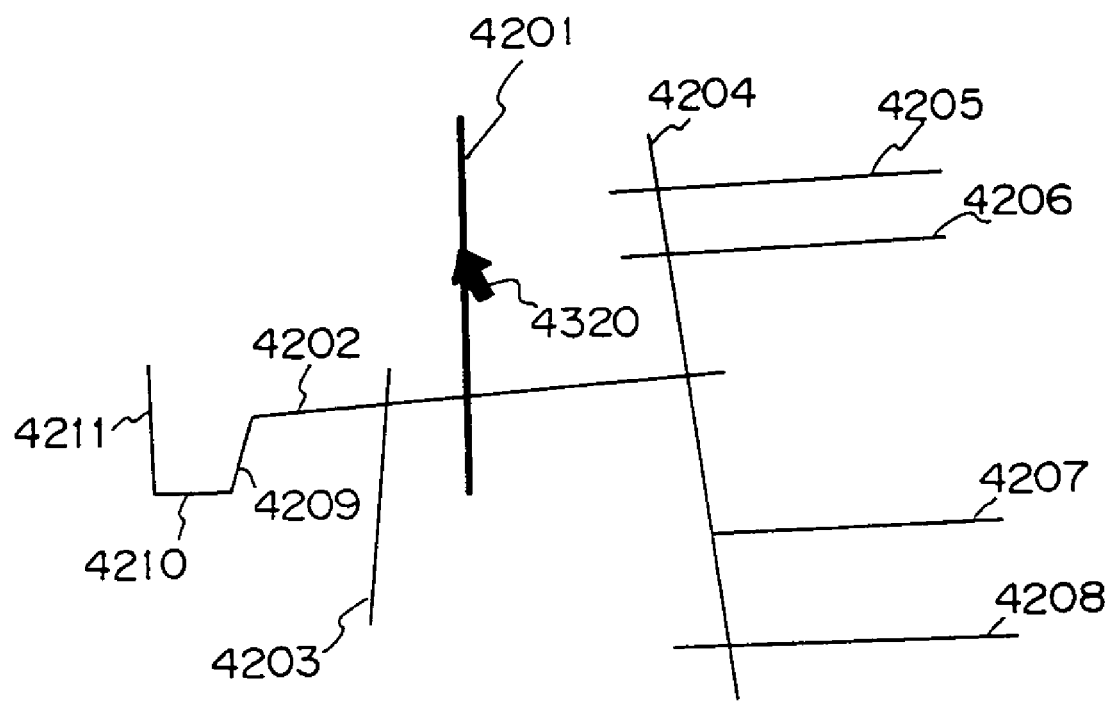
FIG. 46 is a display example (NO. 2) when the continuous-line-group extraction process is being performed.

As shown in FIG. 46, an operator places the head of an arrow-shaped pointer 4320 on the figure element 4201 using an input unit such as a mouse or the like, and clicks the mouse. Thus, the figure element 4201 is designated as the head figure element of the continuous-line-group 4230 desired by the operator. Then, the ID of the figure element 4201 is registered in item "figure element ID" in Table 1, setting the figure element 4201 as a reference element. The ID of the figure element 4201 is registered in item "figure element ID", and a coordinate value of the pointer 4320 is registered in item "reference point coordinate value", in Table 3. Then, the figure element 4201 is echo-displayed in a predetermined color (in FIG. 46, the element is displayed by a bold line).

Figure 47:
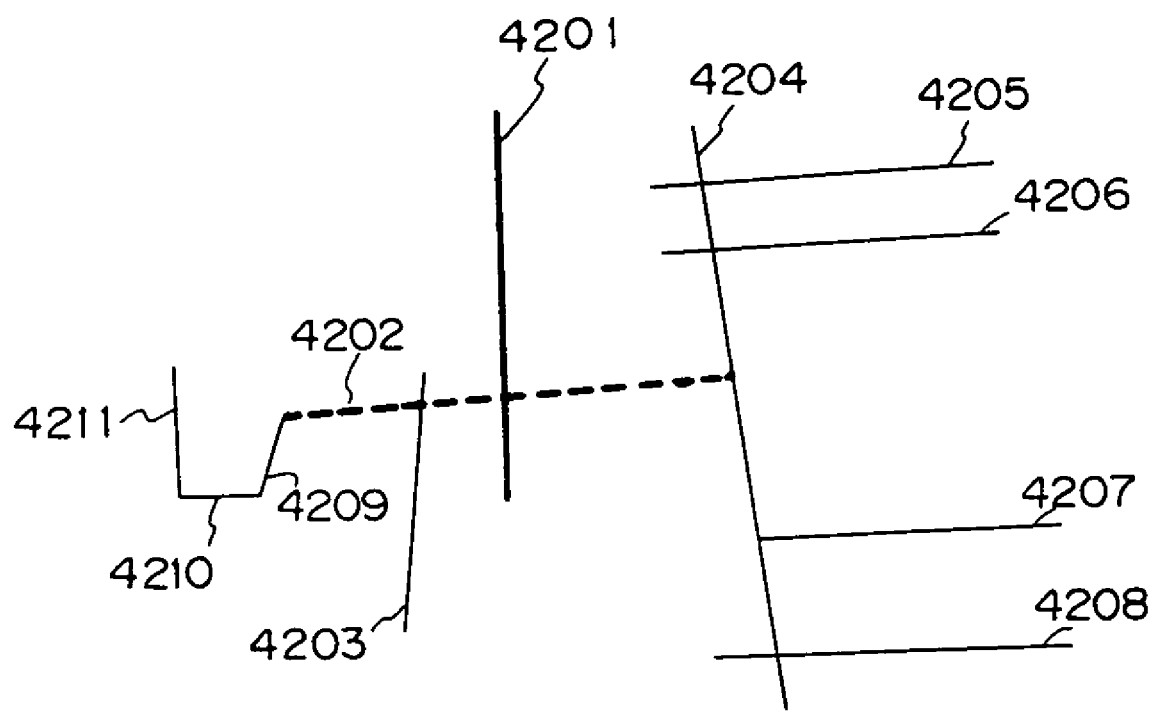
FIG. 47 is a display example (NO. 3) when the continuous-line-group extraction process is being performed.

Next, a retrieval processes for the first generation (the crossed-element retrieval process, the end-connected-element retrieval process, the shape-corrected branch element retrieval process, or the like) are performed based on the information registered in Table 3. Since a branch element observed from the figure element 4201 is only the figure element 4202 retrieved by the crossed-element retrieval process as shown in FIG. 47, 1 is registered in item "crossed element number" in Table 5, and the ID of the figure element 4202 is registered in item "crossed figure element ID". Further, the figure element 4202 is displayed in a predetermined candidate color (in the figure, a dotted line). Then, information about the figure element 4202 is registered as a branch candidate in Tables 7 and 8.

Figure 48:
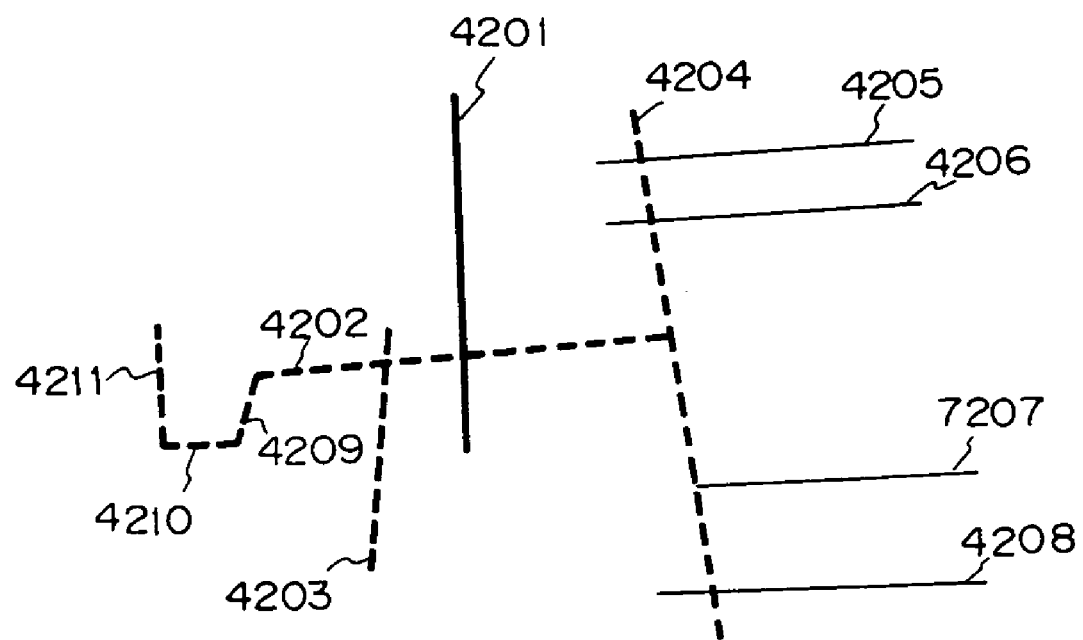
FIG. 48 is a display example (NO. 4) when the continuous-line-group extraction process is being performed.

Since the figure element retrieved by the retrieval process for the first generation is only figure element 4201, a retrieval process for the second generation is performed setting the figure element 4201 as a reference element. Next, three figure elements such as the figure elements 4203 and 4204 retrieved by the crossed-element retrieval process and a figure element 4203 retrieved by the end-connected-element retrieval process are recognized as branch candidates observed from the figure element 4202. Then, information about the figure elements are registered in the respective tables. When a branch candidate retrieved by the end-connected-element retrieval process is one for the respective ends of the reference element, or when a branch candidate retrieved by the end-connected element retrieval process is an end of the other side in the case where a reference candidate is the branch retrieved by the end-connected-element retrieval process, the end-connected-element retrieval process is recursively performed regardless of the established number of generations. Five figure elements such as figure elements 4203, 4204, and 4209 to 4211 are recognized as branch candidates observed from the figure element 4202 by the retrieval process for the second generation including the recursively performed end-connected-element retrieval process. The information about the figure elements are registered in the respective tables. As shown in FIG. 48, the figure elements are displayed in a predetermined candidate color. Since the established generation number is 2, the process will enter an input-waiting state.

Figure 49:
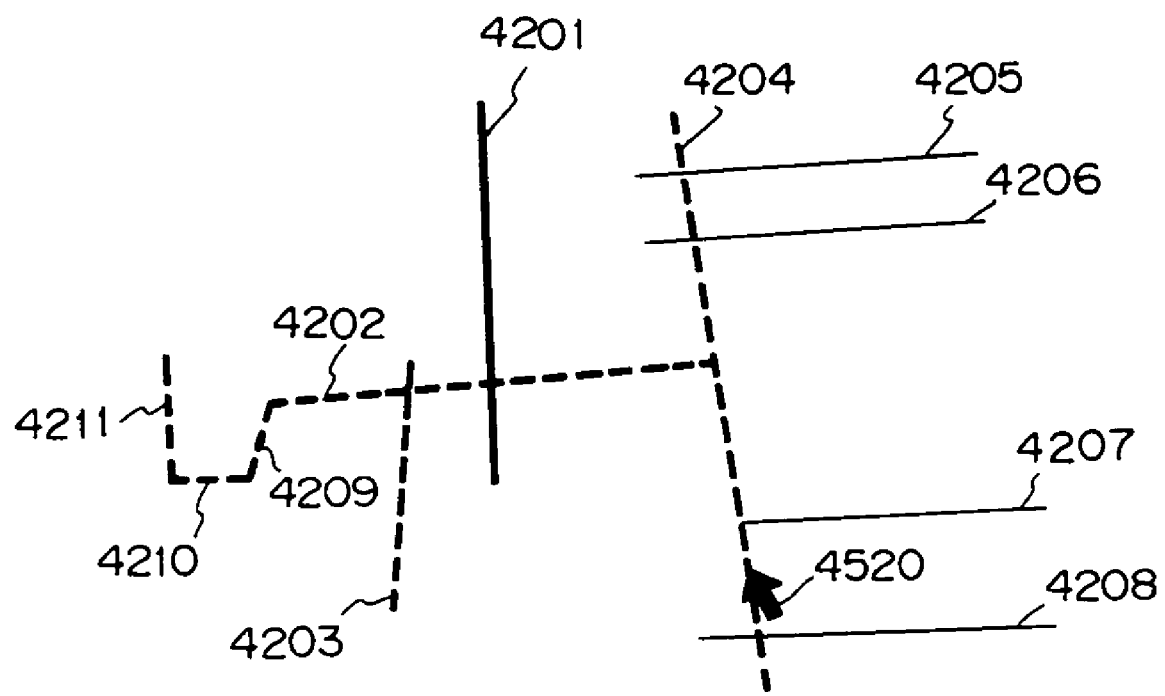
FIG. 49 is a display example (NO. 5) when the continuous-line-group extraction process is being performed.

As shown in FIG. 49, an operator places the head of the pointer 4520 on the figure element 4204, and clicks the mouse to designate a figure element 4204, which is one of the branch candidates.

Figure 50:
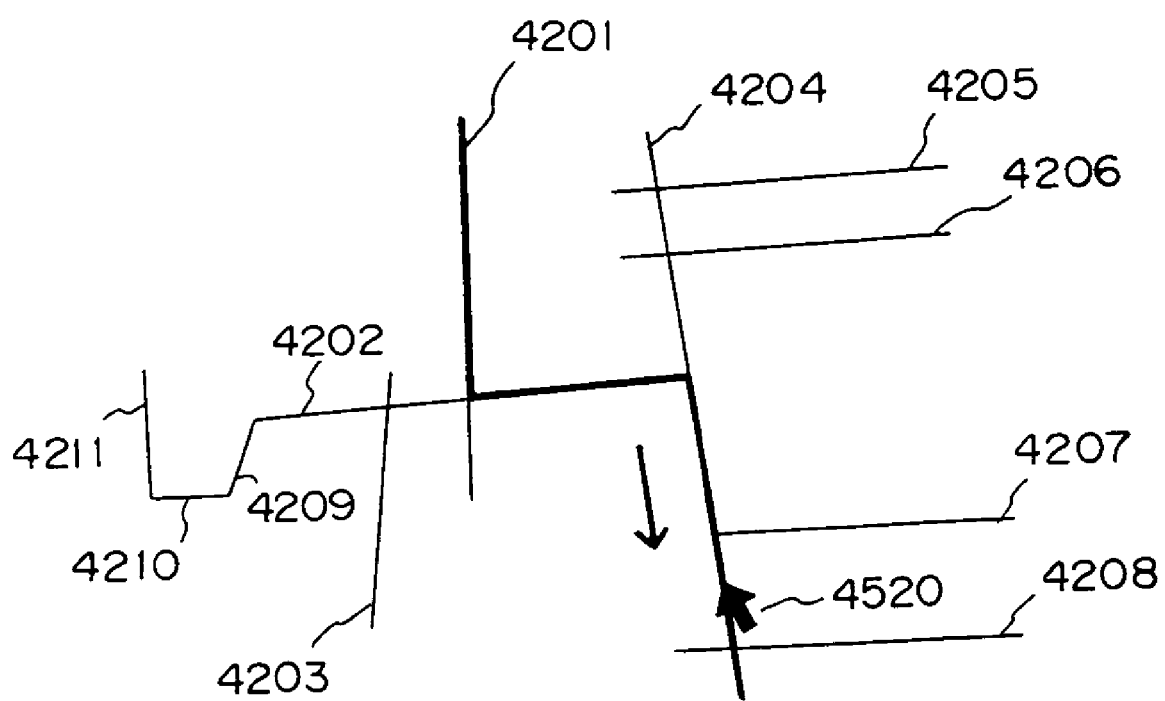
FIG. 50 is a display example (NO. 6) when the continuous-line-group extraction process is being performed.

When the figure element 4204 is designated, FIG. 50 is displayed by the coordinate value of the pointer 4520, which is registered in Table 3 as a reference point coordinate value of figure element 4204, crossed coordinate values of the figure elements 4202 and 4204 are registered in Table 6, the direction (arrow in the figure) is registered in Table 4 and the like.

Figure 51:
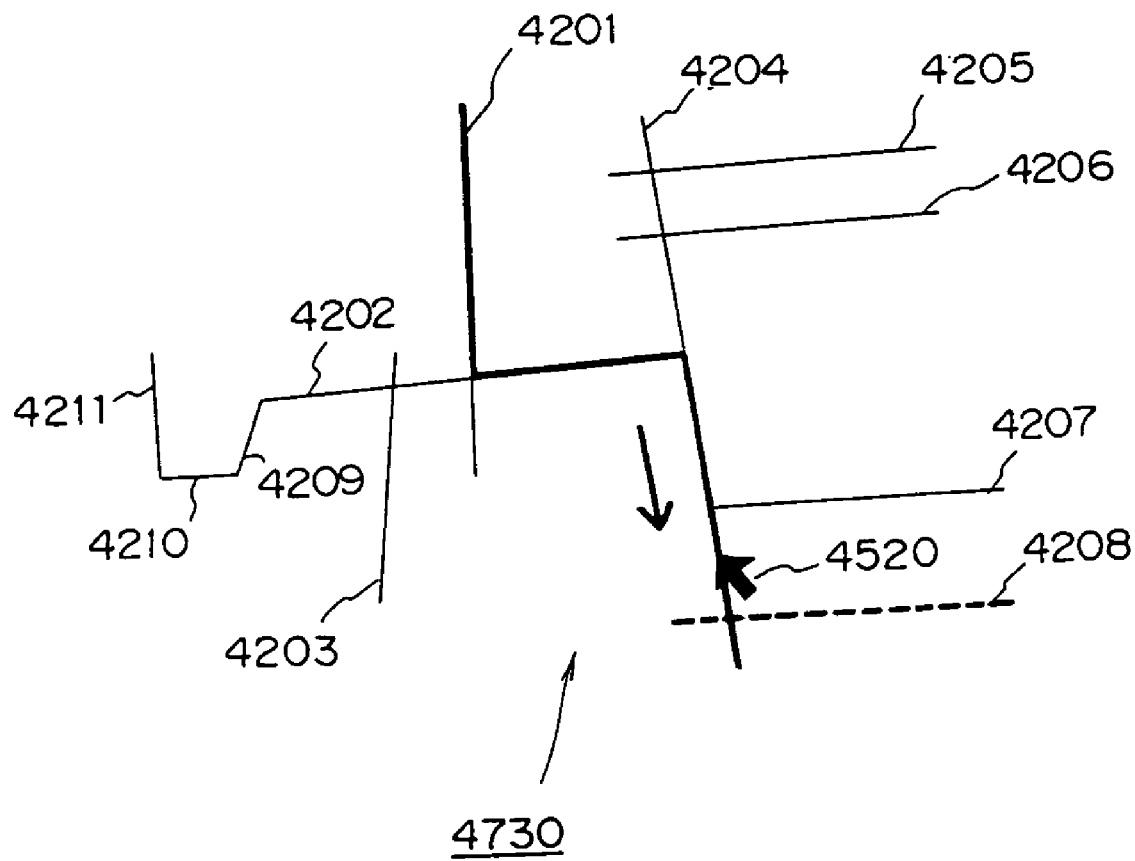
FIG. 51 is a display example (NO. 7) when the continuous-line-group extraction process is being performed.

Further, by designating the figure element 4204, a retrieval process for the new first generation is performed by setting the figure element 4204 as a reference element. The difference from the above-mentioned retrieval process for the first generation lies in the fact that information about the direction is registered in Table 4. In a retrieval process for the new first generation, a figure element retrieved by the respective retrieval processes as a branch candidate based on the information about the direction is only a figure element 4208 as shown in FIG. 51. Although a figure element 4207 crosses the figure element 4204, the element 4207 is not regarded as a branch candidate since it is located ahead of the reference point.

As mentioned above, the continuous-line-group extraction process is performed, and an operator can select the desired figure 4230 by designating only figure elements 4201 and 4204.

With respect to a method of displaying a figure element which is a candidate for selection or a designated figure element, any method is available if the above-mentioned figure element can be distinguished from the other elements. For example, a method of displaying the figure element in a bold line, in a different color, or flashing is also available. Another example is a method of relatively highlighting the figure element by coloring the other figure elements gray. Still another example is a method of displaying the element figure in a separate window after it is reduced or simplified.

The present invention can apply to any single device, any system or any integrated device composed of several devices, or any system performing a process via a network such as LAN, WAN or the like, if the functions of the present invention can be performed.

Figure 52:
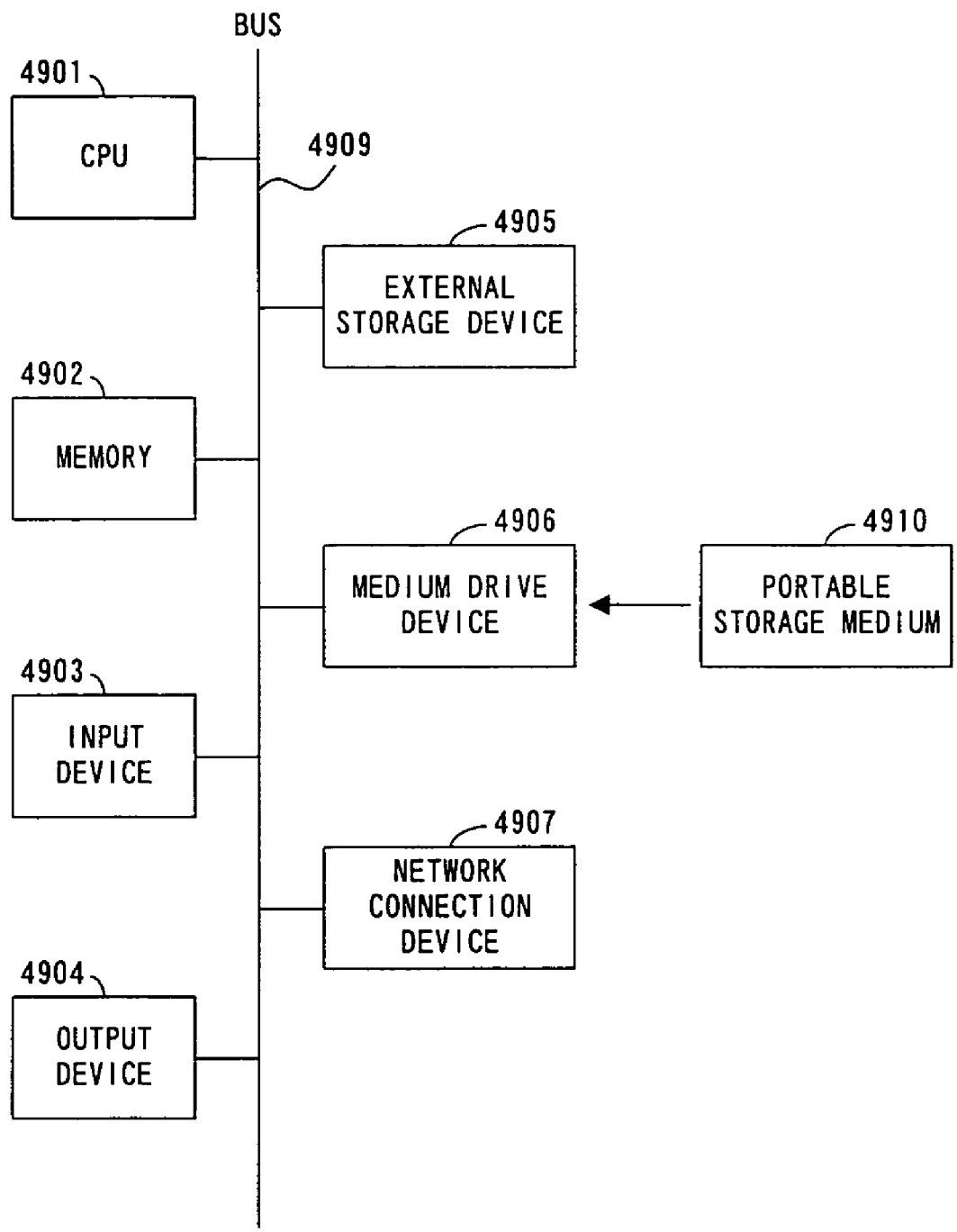
FIG. 52 is a diagram showing the arrangement of an information process device.

As shown in FIG. 52, the present invention can be realized by a system composed of a CPU 4901 connected with a bus 4909, a memory 4902 such as ROM or RAM, an input device 4903, an output device 4904, an external storage device 4905, a medium drive device 4906, a portable storage medium 4910, and a network connection device 4907. That is, the present invention can also be realized by installing a system or a device the memory 4902 such as ROM or RAM, the external storage device 4905, and the portable storage medium 4909 which store the program code of software for realizing a system of each above-mentioned embodiment, so that a computer (or CPU 4901 or MPU) of the system or the device reads out the program code to be performed.

In this case, the program code which is read out by each storage medium can realize a new function of the present invention. Therefore, the portable storage medium 4910 which stores the program code forms the present invention.

As the portable storage medium 4910 for supplying a program code, for example, a floppy disk, a hard disk, an optical disk, a magneto-optical disk, a CD-ROM, a CD-R, a DVD-ROM, a DVD-RAM, a magnetic tape, a nonvolatile memory, a ROM card, various kinds of storage media using the network connection device 4907 (in other word, communication line) such as E-mail, personal communication communications or the like, can be used.

Figure 53:
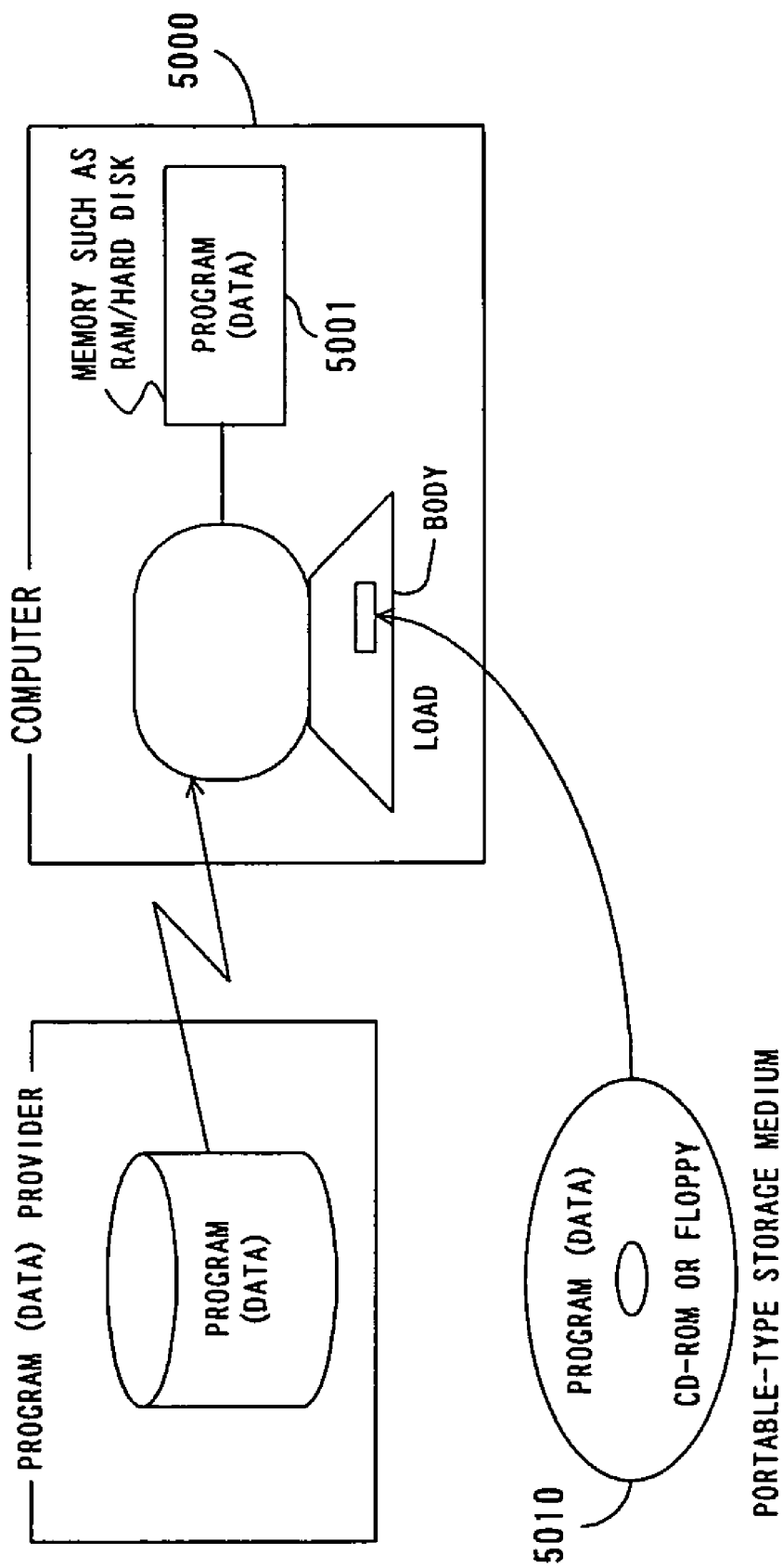
FIG. 53 is a diagram showing the arrangement of a system.

As shown in FIG. 53, the function of the above-mentioned embodiment is realized by executing a program code which is read out from a memory 5001 via a computer 5000. In addition, the function is also realized by performing part or all of the processes via an OS on the computer 5000 based on the program code.

Further, the function can be realized in such a way that after a program code which is read out by the portable storage medium 5010 is written in a memory accommodated in (1) an expansion board installed in the computer 5000 or (2) a function expansion unit connected with the computer, a CPU accommodated in the function expansion board or the function expansion unit performs part or all of the processes based on the instructions of the program code.

As mentioned above, using a figure selection method, a figure selection device, and a storage medium storing a figure selection program of the present invention, an operator can reduce the number of operations for selecting a desired figure. Therefore, he/she can efficiently select the desired figure in a short time.

What is claimed is:

1. A figure selection method of selecting a figure formed by a plurality of figure elements, comprising:

designating one of the figure elements; and retrieving another figure element which is related to the designated figure element without requiring that the other figure element be connected with the designated figure element.

2. The figure selection method according to claim 1 wherein said retrieving retrieves figure elements in a neighborhood of the designated figure element.

3. The figure selection method according to claim 1 wherein said retrieving further retrieves figure elements adjacent to the retrieved figure elements.

4. The figure selection method according to claim 3 wherein said retrieving performs a retrieval process a predetermined number of times.

5. The figure selection method according to claim 1 further comprising:

displaying the figure elements retrieved by said retrieving in a style different from that of other figure elements.

6. A figure selection device selecting a figure formed by a plurality of figure elements, comprising:

a figure element designation unit designating one of the figure elements; and a figure element retrieval unit retrieving other figure elements related to the designated figure element without requiring that the other figure elements be connected with the designated figure element.

7. The figure selection device according to claim 6 wherein the figure element retrieval unit retrieves a figure element in a neighborhood of the designated figure element.

8. The figure selection device according to claim 6 wherein the figure element retrieval unit further retrieves a figure element adjacent to the retrieved figure element.

9. The figure selection device according to claim 8 wherein the figure element retrieval unit performs a retrieval process a predetermined number of times.

10. The figure selection device according to claim 6 further comprising:

a display unit displaying the figure element retrieved by the figure element retrieval unit in a style different from that of other figure elements.

11. A computer-readable storage medium storing a figure selection program selecting a figure formed by a plurality of figure elements, comprising:

designating one of the figure elements; and retrieving another figure element related to the designated figure element without requiring that the other figure element be connected with the designated figure element.

12. The computer-readable storage medium according to claim 11 wherein said retrieving retrieves a figure element in a neighborhood of the designated figure element.

13. The computer-readable storage medium according to claim 11 wherein said retrieving further retrieves a figure element adjacent to the retrieved figure element.

14. The computer-readable storage medium according to claim 13 wherein said retrieving performs a retrieval process at a predetermined number of times.

15. The computer-readable storage medium according to claim 11 further comprising:

displaying the figure element retrieved by said retrieving in a style different from that of other figure elements.

16. A figure selection method of selecting a figure having elements, comprising:

defining relationship of the elements of the figure; and automatically retrieving elements of the figure in accordance with said defined relationship of the elements upon selection of one of the elements in the relationship without requiring that said one of the elements be connected with the retrieved elements.

17. A figure selection method, comprising:

defining arrangement data indicative of an arrangement of elements that form a corresponding figure based on a relationship of the elements including unconnected elements of a first figure and a second figure; and selecting an element of the first figure in response to a selection of at least one element of the second figure based on the arrangement data.

* * * * *

UNITED STATES PATENT AND TRADEMARK OFFICE
CERTIFICATE OF CORRECTION

| | |
|---|---|
| PATENT NO. | : 7,298,382 B1 |
| APPLICATION NO. | : 09/461335 |
| DATED | : November 20, 2007 |
| INVENTOR(S) | : Kazuo Tanaguchi et al. |

It is certified that error appears in the above-identified patent and that said Letters Patent is hereby corrected as shown below:

Title Page, Column 1 (Other Publications), Line 1, change "Aodobe Phototshop" to --Adobe Photoshop--.

Signed and Sealed this

Twentieth Day of May, 2008

JON W. DUDAS
*Director of the United States Patent and Trademark Office*